(12) United States Patent
Brochu et al.

(10) Patent No.: US 7,701,679 B2
(45) Date of Patent: Apr. 20, 2010

(54) BATHING SYSTEM CONTROLLER HAVING ABNORMAL OPERATIONAL CONDITION IDENTIFICATION CAPABILITIES

(75) Inventors: Christian Brochu, Quebec (CA); Benoit LaFlamme, Quebec (CA); Daniel Gaudreau, St-Jean Chrysostome (CA); Martin Hardy, St-Augustin (CA); Louis Nollet, Sainte-Foy (CA); Florent Gougereau, Quebec (CA); Michel Authier, St-Augustin (CA)

(73) Assignee: Gecko Alliance Group Inc., Quebec, Quebec (CA)

( * ) Notice: Subject to any disclaimer, the term of this patent is extended or adjusted under 35 U.S.C. 154(b) by 79 days.

(21) Appl. No.: 11/797,233

(22) Filed: May 2, 2007

(65) Prior Publication Data

US 2007/0200698 A1    Aug. 30, 2007

Related U.S. Application Data

(63) Continuation of application No. 10/768,130, filed on Feb. 2, 2004, now Pat. No. 7,327,275.

(51) Int. Cl.
*H02H 3/00* (2006.01)
(52) U.S. Cl. ....................................... 361/42
(58) Field of Classification Search ............... 361/42
See application file for complete search history.

(56) References Cited

U.S. PATENT DOCUMENTS

| | | | |
|---|---|---|---|
| 3,953,766 A | * | 4/1976 | Howell et al. .............. 361/45 |
| 4,424,438 A | | 1/1984 | Antelman et al. |
| 4,586,180 A | | 4/1986 | Andres et al. |
| 4,763,365 A | | 8/1988 | Gerondale et al. |
| 4,897,755 A | | 1/1990 | Polster et al. |
| 5,361,215 A | | 11/1994 | Tompkins et al. |

(Continued)

FOREIGN PATENT DOCUMENTS

DE    39 33 118 A1    4/1991

(Continued)

OTHER PUBLICATIONS

Office Action mailed on Dec. 11, 2009 in connectiion with U.S. Appl. No. 12/000,680, 14 pages.

*Primary Examiner*—Stephen W Jackson
*Assistant Examiner*—Ann T Hoang

(57) ABSTRACT

A controller suitable for identifying an abnormal operational condition in a bathing system is provided. The controller includes a processing unit for detecting an abnormal operational condition associated with the bathing system. In response to detection of an abnormal operational condition, the processing unit causes a ground fault circuit interrupter (GFCI) associated to the bathing system to trip. In a first example, the controller includes a memory unit adapted for storing measurements indicative of electrical currents drawn by respective bathing unit components under normal operating conditions. The processing unit is adapted for detecting an abnormal operational condition associated with the bathing system at least in part based on measurements stored on the memory unit. In a second example, the controller includes a plurality of actuators associated to respective bathing unit components operative for causing bathing unit components to acquire either one of the actuated state or the non-actuated state. The processing unit is adapted for detecting an abnormal operational condition associated with one or more actuators in the plurality of actuators.

36 Claims, 10 Drawing Sheets

U.S. PATENT DOCUMENTS

| | | | |
|---|---|---|---|
| 5,536,980 A | 7/1996 | Kawate et al. | |
| 5,550,753 A | 8/1996 | Tompkins et al. | |
| 5,559,664 A * | 9/1996 | Dogul et al. | 361/191 |
| 5,559,720 A | 9/1996 | Tompkins et al. | |
| 5,563,799 A | 10/1996 | Brehmer et al. | |
| 5,569,966 A * | 10/1996 | Schantz et al. | 307/10.1 |
| 5,572,177 A | 11/1996 | Fujiwara | |
| 5,585,025 A | 12/1996 | Idland | |
| 5,682,057 A | 10/1997 | Kuriyama | |
| 5,698,887 A | 12/1997 | Kumano et al. | |
| 5,708,548 A | 1/1998 | Greeve et al. | |
| 5,835,885 A | 11/1998 | Lin | |
| 5,875,087 A | 2/1999 | Spencer et al. | |
| 6,058,353 A * | 5/2000 | Goodpaster | 702/58 |
| 6,080,973 A | 6/2000 | Thweatt, Jr. | |
| 6,097,580 A * | 8/2000 | Zaretsky | 361/42 |
| 6,238,387 B1 * | 5/2001 | Miller, III | 606/34 |
| 6,253,121 B1 * | 6/2001 | Cline et al. | 700/300 |
| 6,253,227 B1 | 6/2001 | Tompkins et al. | |
| 6,282,370 B1 | 8/2001 | Cline et al. | |
| 6,441,348 B1 | 8/2002 | Yang et al. | |
| 6,476,363 B1 | 11/2002 | Authier et al. | |
| 6,590,188 B2 | 7/2003 | Cline et al. | |
| 6,629,021 B2 | 9/2003 | Cline et al. | |
| 6,643,108 B2 | 11/2003 | Cline et al. | |
| 6,734,781 B1 | 5/2004 | Nagashima | |
| 6,756,907 B2 | 6/2004 | Hollaway | |
| 6,782,309 B2 | 8/2004 | Laflamme et al. | |
| 6,836,174 B1 | 12/2004 | Chang | |
| 6,850,159 B1 | 2/2005 | Mudge | |
| 6,874,175 B2 | 4/2005 | Laflamme et al. | |
| 7,440,864 B2 | 10/2008 | Otto | |
| 2001/0003216 A1 | 6/2001 | Komulainen | |
| 2001/0025349 A1 | 9/2001 | Sharood et al. | |
| 2002/0089236 A1 | 7/2002 | Cline et al. | |
| 2002/0175828 A1 | 11/2002 | Macey | |
| 2003/0063900 A1 | 4/2003 | Wang et al. | |
| 2004/0088593 A1 | 5/2004 | Park | |
| 2004/0141265 A1 * | 7/2004 | Angle et al. | 361/44 |
| 2005/0097669 A1 * | 5/2005 | Tobin et al. | 4/622 |
| 2005/0127197 A1 | 6/2005 | Uy et al. | |

FOREIGN PATENT DOCUMENTS

| | | |
|---|---|---|
| EP | 05 10 0611 | 5/2005 |
| EP | 05 10 0611 | 6/2005 |
| EP | 05 29 0224 | 6/2005 |
| EP | 05 29 0224 | 3/2006 |
| JP | 07180903 A | 7/1995 |
| JP | 10115108 A * | 5/1998 |
| JP | 2000037434 A | 2/2000 |
| JP | 2000037435 A | 2/2000 |
| JP | 2000333859 A | 12/2000 |
| JP | 2002233589 A * | 8/2002 |
| WO | WO 9627138 A1 * | 9/1996 |

* cited by examiner

BATHING SYSTEM CONTROLLER HAVING ABNORMAL OPERATIONAL CONDITION IDENTIFICATION CAPABILITIES

CROSS REFERENCE TO RELATED APPLICATIONS

This application is a continuation application claiming the right of priority under 35 USC §120 of U.S. patent application Ser. No. 10/768,130, which was filed on Feb. 2, 2004 now U.S. Pat. No. 7,327,275. The contents of the above noted application are incorporated herein by reference.

FIELD OF THE INVENTION

The present invention relates to controllers suitable for use in bathing systems and, more particularly, to controllers adapted to for identifying abnormal operational conditions in bathing systems.

BACKGROUND

A bathing system, such as a spa, typically includes various components such as a water holding receptacle, pumps to circulate water in a piping system, a heating module to heat the water, a filter system, an air blower, an ozone generator, a lighting system, and a control system for actuating and managing the various parameters of the bathing system components. Other types of bathing systems having similar components include, for instance, whirlpools, hot tubs, bathtubs, therapeutic baths, and swimming pools.

Typically, the control system of a bathing system includes a controller to which are connected the various bathing system components. The controller is adapted to control the power supplied to each one of the connected components. The controller receives input signals from various input devices such as, for example, a plurality of sensors that monitor the various components of the bathing system and a control panel allowing a user to control various operational settings of these components. In response to the input signals, the controller actuates, or de-actuates, the various bathing system components by supplying power, or ceasing to supply power, to those components.

The components in a bathing system, including the controller, are susceptible to abnormal operational conditions in which they operate in manners that do not correspond to their respective normal operational conditions. An abnormal operational condition can result, for example, from an operational failure in one or multiple components of the bathing system. Such an operational failure in a bathing system component can be due to a mechanical or electronic malfunction in the component, or to the component experiencing operating conditions for which it was not designed to operate in. For instance, inappropriate operating conditions can result from a blockage or clogging of the piping system leading to a pump and to a heating module of the bathing system, resulting in the pump operating at an inadequate flow rate and the heating module operating with an insufficient water level. An abnormal operational condition can also result from a decrease in operational efficiency of one or multiple components of the bathing system due to wear of the components in time.

Generally, abnormal operational conditions associated with the bathing system remain undetected by the controller and are thus not attended to for a certain period of time. As a result, the one or multiple bathing system components causing the abnormal operational conditions continue to operate in conditions for which they were not designed to operate in. This usually leads to accelerated wear of, or permanent damage to, the one or multiple components of the bathing system, which eventually results in total operational failure of the one or multiple components.

Consequently, it is normally only after the occurrence of a total operational failure of one or multiple components of the bathing system that an abnormal operational condition associated with the bathing system is detected. At that point, a bathing system service person or technician is typically brought in to investigate the abnormal operational condition experienced by the bathing system and to identify the potential component or components causing the abnormal operational condition. In doing so, the bathing system service person or technician typically has to run a series of tests on the controller and various bathing system components in order to pinpoint the one or multiple components responsible for the abnormal operational condition of the bathing system. The whole process is thus inconvenient, time-consuming and expensive for the bathing system owner, which is also likely to incur additional costs related to the repair or replacement of the malfunctioning bathing system components.

In light of the above, there is a need in the industry to provide a controller suitable for a bathing system that alleviates at least in part the problems associated with existing controllers.

SUMMARY

In accordance with a broad aspect, the invention provides a controller suitable for identifying an abnormal operational condition in a bathing system, the bathing system including a set of bathing unit components, each bathing unit component being adapted for acquiring an actuated state and a non-actuated state. The controller is suitable for establishing a connection with a power source through a ground fault circuit interrupter (GFCI). The controller comprising a memory unit adapted for storing measurements indicative of electrical currents drawn by the bathing system under normal operating conditions, at least some measurements being indicative of electrical currents being drawn by respective bathing unit components when in the actuated state. The controller also comprises a processing unit adapted for detecting an abnormal operational condition associated with the bathing system at least in part based on measurements stored on the memory unit and on at least one actual current measurement. The processing unit is responsive to detection of an abnormal operational condition associated with the bathing system for causing the ground fault circuit interrupter (GFCI) to trip.

In accordance with another broad aspect, the invention provides a controller suitable for use in a bathing system, the bathing system including a set of bathing unit components, each bathing unit component being adapted for acquiring an actuated state and a non-actuated state, the bathing unit components drawing an electrical current when in the actuated state. The controller is suitable for establishing a connection with a power source through a ground fault circuit interrupter (GFCI). The controller comprises a plurality of actuators associated to respective bathing unit components, during normal operational conditions the actuators being operative for causing bathing unit components to acquire either one of the actuated state or the non-actuated state. The controller also comprises a processing unit in communication with the plurality of actuators. The processing unit is operative for controlling the plurality of actuators such as to cause the bathing unit components in the set of bathing unit components to acquire either one of the actuated state or the non-actuated state. The processing unit is also operative for detecting an abnormal operational condition associated with an actuator in the plurality of actuators. The processing unit is responsive to detection of an abnormal operational condition associated with an actuator in the plurality of actuators for causing the ground fault circuit interrupter (GFCI) to trip.

In accordance with yet another broad aspect, the invention provides a method for monitoring a controller of a bathing system, the controller including a plurality of actuators associated to respective bathing unit components, during normal operational conditions. The actuators are operative for causing bathing unit components to acquire either one of an actuated state and a non-actuated state. The method comprises establishing a connection with a power source through a ground fault circuit interrupter (GFCI). The method also comprises controlling the plurality of actuators such as to cause the bathing unit components in the set of bathing unit components to acquire either one of the actuated state or the non-actuated state. The method also comprises detecting an abnormal operational condition associated with an actuator in the plurality of actuators and in response to detection of an abnormal operational condition associated with an actuator in the plurality of actuators, causing the ground fault circuit interrupter (GFCI) to trip.

In accordance with another broad aspect, the invention provides a controller suitable for identifying an abnormal operational condition in a bathing system, the bathing system including a set of bathing unit components, each bathing unit component being adapted for acquiring an actuated state and a non-actuated state. The controller being suitable for establishing a connection with a power source through a ground fault circuit interrupter (GFCI). The controller comprises a plurality of actuators associated to respective bathing unit components, during normal operational conditions the actuators being operative for causing bathing unit components to acquire either one of the actuated state or the non-actuated state. The controller also comprises a processing unit in communication with the plurality of actuators. The processing unit is operative for detecting an abnormal operational condition associated with at least one component in the set of bathing unit components. The processing unit is responsive to detection of an abnormal operational condition associated with at least one component for controlling the plurality of actuators such as to cause the at least one bathing unit component to acquire the non-actuated state. The processing unit is also operative for detecting an abnormal operational condition associated with an actuator in the plurality of actuators. The processing unit is responsive to detection of an abnormal operational condition associated with an actuator in the plurality of actuators for causing the ground fault circuit interrupter (GFCI) associated to the bathing system to trip.

In accordance with another broad aspect, the invention provides a controller suitable for identifying an abnormal operational condition in a bathing system. The bathing system includes a set of bathing unit components each being adapted for acquiring an actuated state and a non-actuated state. The bathing unit components draw an electrical current when in the actuated state. The controller comprises a memory unit adapted for storing measurements indicative of electrical currents drawn by the bathing system under normal operating conditions, each measurement being indicative of the electrical current being drawn by a respective bathing unit component when in the actuated state. The controller also comprises a processing unit in communication with the memory unit. The processing unit is adapted for modifying the measurements indicative of electrical currents drawn by the bathing system stored in the memory unit and for detecting an abnormal operational condition associated with the bathing system at least in part on the basis of measurements stored on the memory unit.

In accordance with a specific implementation, the memory unit includes a non-volatile memory component on which the measurements indicative of the electrical currents drawn by bathing unit components are stored.

In a first specific implementation, the controller comprises a port for receiving a signal conveying measurements indicative of electrical currents drawn by the bathing system under normal operating conditions. The processing unit is adapted for modifying the measurements indicative of electrical currents drawn by the bathing system stored in the memory unit on the basis of the signal received at the port. Advantageously, this allows for the measurements in the memory unit to be modified without requiring the memory unit to be physically replaced.

In a second specific implementation, the processing unit is adapted for acquiring a self-programming state. In the self-programming state, the processing unit is operative for obtaining measurements indicative of electrical currents drawn by the bathing system under normal operating conditions and for storing these measurements on the memory unit.

In accordance with a specific implementation, in the self-programming state the processing unit is operative for sequentially causing each bathing unit component in the set of bathing unit components to toggle from one of the actuated state and the non-actuated state to the other of the actuated state and the non-actuated state to obtain measurements indicative of electrical currents, each measurement being indicative of the electrical current being drawn by a respective bathing unit component when in the actuated state.

In accordance with another specific implementation, to obtain a measurement indicative of electrical current drawn by a given bathing unit component in the set of bathing unit components, the processing unit causes the given bathing unit component to acquire the actuated state and causes the other bathing unit components in the set of bathing unit components to acquire the non-actuated state.

In a non-limiting implementation, the processing unit includes a sensing circuit adapted for obtaining a measurement indicative of the electrical current being drawn by the bathing system. Optionally, the controller further includes sensing circuitry adapted for obtaining measurements associated to controller components, such as relays and fuses. This sensing circuitry allows identify controller components, such as relays and fuses, as potential causes of an abnormal operational condition associated with the bathing system.

In a specific implementation, the processing unit derives an expected measurement of a current drawn by the bathing system at least in part on the basis of the bathing unit components actuated in the bathing system and the measurements stored on the memory unit. An actual measurement of the current drawn by the bathing system is also obtained. The processing unit then determines if the bathing system is experiencing an abnormal operational condition at least in part on the basis of the expected measurement of a current drawn by the bathing system and the actual measurement of a current drawn by the bathing system.

In accordance with another specific implementation, the processing unit includes means responsive to the detection of an abnormal operational condition associated with the bathing system for causing a GFCI breaker in the bathing system to trip. Any suitable means responsive to the detection of an abnormal operational condition associated with the bathing system for causing a GFCI breaker in the bathing system to trip may be used without detracting from the spirit of the invention. In a non-limiting implementation, the means include a circuit for inducing a current leakage to the ground.

In a specific example of implementation, the processing unit is operative for identifying at least one bathing unit component potentially causing at least part of the abnormal operational condition of the bathing unit. The bathing unit component potentially causing at least part of the abnormal operational condition of the bathing unit may be a pump, an air blower, a heater, an ozonator, a CD player, a power supply or any other component of the bathing system. Optionally, the processing unit is operative for identifying the controller, or a component of the controller, as potentially causing at least part of the abnormal operational condition of the bathing unit.

In a specific implementation, the controller includes an output module in communication with the processing unit for conveying the abnormal operational condition associated to the bathing system.

In implementations where a bathing unit component has been identified as potentially causing at least part the abnormal operational condition of the bathing system, the output module is adapted for conveying information indicative of the identified bathing unit component. The information may be conveyed in any suitable format such as for example a visual or an audio format. When in a visual format, the output module is embodied as part of the user operable control console of the bathing system such as to be seen by the user. Alternatively, the output module is embodied as part of controller box and is intended to be seen by a bathing unit technician.

In an alternative embodiment, the output module includes a transmitter operative to transmit a signal conveying an abnormal operational condition associated to the bathing system. The transmitter is operative to transmit the signal over a wireless link, such as a radio frequency (RF) link or an infrared (IR) link or over a wire-line link to a remote peripheral device. The peripheral device is equipped with the corresponding receiver equipment to receive the signal from the transmitter and convey the information contained therein.

In accordance with a specific implementation, the controller includes a plurality of actuators associated to respective bathing unit components. The processing unit controls the plurality of actuators such as to cause the bathing unit components in the set of bathing unit components to acquire either one of the actuated state or the non-actuated state. In a non-limiting implementation, the processing unit obtains measurements indicative of the state of the plurality of actuators. These measurements may include measurements of the currents through and voltages across the actuators. The processing unit is operative for identifying an actuator in the plurality of actuators as potentially causing at least part of the abnormal operational condition of the bathing unit at least in part on the basis of the measurements obtained.

In accordance with a broad aspect, the invention provides a controller in a bathing system having a set of bathing unit components and a controller. Each bathing unit component is adapted for acquiring an actuated state and a non-actuated state, the bathing unit components drawing an electrical current when in the actuated state. The controller comprises a memory unit adapted for storing measurements indicative of electrical currents drawn by the bathing system under normal operating conditions, each measurement being indicative of the electrical current being drawn by a respective bathing unit component when in the actuated state. The controller also includes a processing unit in communication with the memory unit. The processing unit is adapted for modifying the measurements indicative of electrical currents drawn by the bathing system stored in the memory unit and for detecting an abnormal operational condition associated with the bathing system at least in part on the basis of measurements stored on the memory unit.

In accordance with another broad aspect, the invention provides a controller suitable for identifying an abnormal operational condition in a bathing system. The controller comprises a plurality of fuses, a burned fuse sensing circuit and a processing unit. The burned fuse sensing circuit is adapted for detecting a burned fuse in the plurality of fuses. The burned fuse sensing circuit is responsive to the presence of a burned fuse for releasing a burned fuse indicator signal. The processing unit is in communication with the burned fuse sensing circuit and receives the burned fuse indicator signal. In response to the receipt of the burned fuse indicator signal, the processing unit detects an abnormal operational condition of the bathing system.

In accordance with another broad aspect, the invention provides a controller suitable for use in a bathing system. The bathing system includes a set of bathing unit components, each bathing unit component being adapted for acquiring an actuated state and a non-actuated state, the bathing unit components drawing an electrical current when in the actuated state. The controller comprises a plurality of actuators associated to respective bathing unit components and a processing unit in communication with the plurality of actuators. The processing unit is operative for controlling the plurality of actuators such as to cause the bathing unit components in the set of bathing unit components to acquire either one of the actuated state or the non-actuated state. The processing unit is also adapted for obtaining measurements indicative reaction times associated to the actuators in the plurality of actuators and for storing the measurements obtained on a memory unit.

In a specific implementation, the processing unit is operative for detecting an abnormal operational condition associated with an actuator in the plurality of actuators at least in part on the basis of measurements stored on the memory unit.

In a specific implementation, at least some actuators in the plurality of actuators are adapted for acquiring either one of a closed status and an open status for causing bathing unit components to acquire either one of the actuated state or the non-actuated state. In this specific implementation, the measurements indicative reaction times associated to the actuators in the plurality of actuators include opening reaction times and closing reaction times. The processing unit is adapted for causing a given actuator to acquire the closed status when a voltage across the given actuator is near zero. The processing unit is also adapted for causing a given actuator to acquire the open status when a current through the given actuator is near zero.

In accordance with a specific example, the processing unit obtains a measurement indicative of an actual reaction time associated with a given actuator in the plurality of actuators and is adapted to detect an abnormal operational condition associated with a given actuator at least in part on the basis the actual reaction time and a certain threshold reaction time. In accordance with an alternative implementation, the processing unit obtains a measurement indicative of an actual reaction time associated with a given actuator in the plurality of actuators and detects an abnormal operational condition associated with a given actuator at least in part on the basis the actual reaction time and a certain range of accepted reaction times. The certain threshold reaction time and the certain range of accepted reaction times may be derived at least in part on the basis of past measurements obtained by the processing unit or alternatively may be set to a default threshold reaction time or default range of accepted reaction times.

In accordance with another broad aspect, the invention provides a method for programming a controller of a bathing system. The bathing system includes a set of bathing unit components, each bathing unit component being adapted for acquiring an actuated state and a non-actuated state, the bathing unit components drawing an electrical current when in the actuated state. The method comprises obtaining measurements indicative of electrical currents drawn by the bathing system, each measurement being indicative of the electrical current being drawn by a respective bathing unit component when in the actuated state. The method also includes storing the measurements on a memory unit in communication with the controller.

In a specific implementation, the method includes causing the bathing unit components in the set of bathing unit components to acquire the non-actuated state and sequentially actuating bathing unit components in the set of bathing unit components to obtain measurements indicative of electrical currents. Each measurement is indicative of the electrical current being drawn by a respective bathing unit component when in the actuated state.

In an alternative implementation, obtaining measurements indicative of electrical currents drawn by the bathing unit components when in the actuated state comprises, for each given bathing unit component in the set of bathing unit components causing the given bathing unit component to acquire the actuated state and causing the bathing unit components in the set of bathing unit components other than the given bathing unit component to acquire the non-actuated state.

In accordance with yet another broad aspect, the invention provides a method for monitoring a bathing system. The bathing system includes a set of bathing unit components, each bathing unit component being adapted for acquiring an actuated state and a non-actuated state, in the actuated state the bathing unit components drawing an electrical current. The method comprises providing a memory unit including a plurality of data elements, the data elements being indicative of measurements of electrical currents drawn by respective bathing unit components when in the actuated state under normal operational conditions. The method also includes deriving an expected measurement of a current drawn by the bathing system at least in part on the basis of the data elements stored on the memory unit and obtaining an actual measurement of a current drawn by the bathing system. The method also includes detecting an abnormal operational condition associated with a bathing unit component in the set of bathing unit components at least in part on the basis of the expected measurement of a current drawn by the bathing system and the actual measurement of a current drawn by the bathing system.

In accordance with yet another broad aspect, the invention provides a controller suitable for use in a bathing system. The bathing system includes a set of bathing unit components, each bathing unit component being adapted for acquiring an actuated state and a non-actuated state, the bathing unit components drawing an electrical current when in the actuated state. The controller includes a current sensor adapted for obtaining a measurement of a current drawn by the bathing system, the measurement including a reactive current measurement portion and a real current measurement portion. The controller also includes a control unit in communication with the current sensor adapted to detect an abnormal operational condition associated with the bathing system at least in part on the basis of the measurement of the current drawn by the bathing system.

In accordance with a specific implementation, the control unit is adapted for processing the reactive current measurement portion and the real current measurement portion to derive a power factor associated with bathing system.

In accordance with yet another broad aspect, the invention provides a bathing system comprising a plurality of components and a controller in communication with the plurality of components. The controller comprises sensing circuitry, a memory unit and a processing unit. The memory unit adapted for storing measurements indicative of electrical currents drawn by the bathing system under normal operating conditions, each measurement being indicative of the electrical current being drawn by a respective bathing unit component when in the actuated state. The sensing circuitry is adapted for obtaining measurements associated to respective components in the plurality of components, at least some measurements being indicative of current measurements. The processing unit is in communication with the sensing circuitry and the memory unit and is adapted for modifying the measurements indicative of electrical currents drawn by the bathing system stored in the memory unit and for detecting an abnormal operational condition associated with the bathing system at least in part on the basis of measurements stored on the memory unit.

In a specific implementation, the plurality of components includes components selected from the set consisting of bathing unit components, fuses and relays.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of the embodiments of the present invention is provided herein below, by way of example only, with reference to the accompanying drawings, in which.

Figure 1:
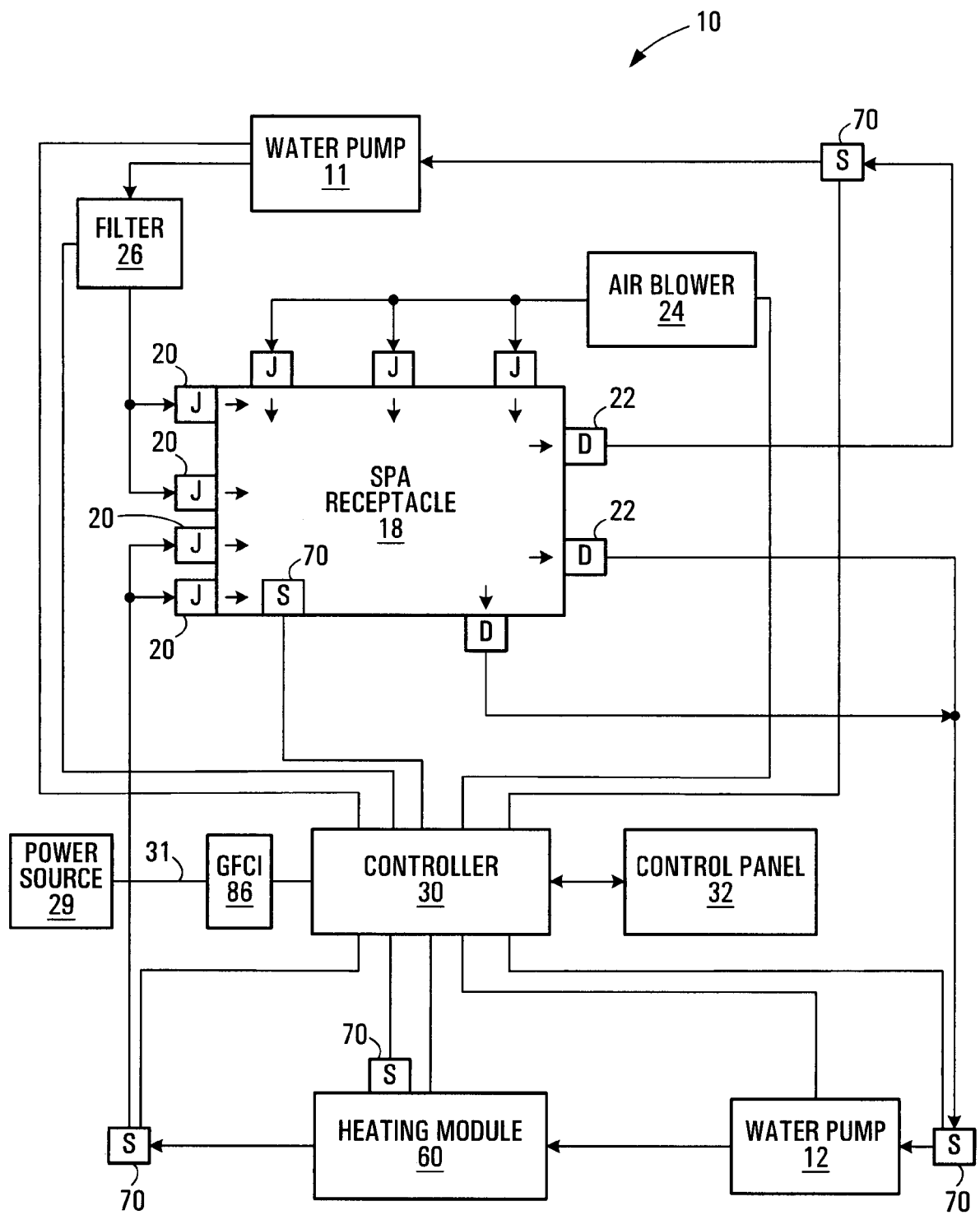
FIG. 1 is a block diagram of a spa system equipped with a controller in accordance with a specific example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

The description below is directed to a specific implementation of the invention in which the bathing system is embodied as a spa system. It is to be understood that the term "spa system", as used for the purposes of the present description, refers to spas, whirlpools, hot tubs, bathtubs, therapeutic baths, swimming pools and any other type of bathing system that can be equipped with a control system for controlling various operational settings.

FIG. 1 illustrates a block diagram of a spa system 10 in accordance with a specific example of implementation. The spa system 10 includes a spa receptacle 18 for holding water, a plurality of jets 20, a set of drains 22 and a control system. In the non-limiting embodiment shown, the control system includes a control panel 32, a controller 30, and a plurality of sensors 70 that monitor the various components of the spa. For example, the sensors 70 may include temperature and liquid level sensors to respectively monitor the water temperature and water level at various locations in the spa system 10.

In the specific embodiment shown in FIG. 1, the spa system 10 further includes a plurality of spa components including a heating module 60, two water pumps 11 & 12, a filter 26 and an air blower 24. It should be understood that the spa system 10 could include more or less spa components without departing from the spirit of the invention. For example, although not shown in FIG. 1, the spa system 10 could include a lighting system for lighting up the water in the receptacle 18, multimedia devices such as a CD/DVD player and any other suitable device.

In normal operation, water flows from the spa receptacle 18, through drain 22 and is pumped by water pump 12 through heating module 60 where the water is heated. The heated water then leaves the heating module 60 and re-enters the spa receptacle 18 through jets 20. In addition, water flows from the spa receptacle 18, through drain 22 and is pumped by water pump 11 through filter 26.

The filtered water then re-enters the spa receptacle 18 through jets 20. Water can flow through these two cycles continuously while the spa system 10 is in operation. For its part, the air blower 24 is operative for delivering air bubbles to the spa receptacle 18.

Generally, each one of the components of the spa system 10 is capable of acquiring both an actuated state and a non-actuated state. In an actuated state, a given component of the spa system 10 receives power by drawing an electrical current at a certain voltage from the controller 30 via a respective electrical cable and utilizes the received power to perform the function for which it was designed. Conversely, in a non-actuated state, the given component does not receive power from the controller 30 and is essentially turned off. For instance, when in an actuated state, pump 12 draws an electrical current at a certain voltage from the controller 30 in order to perform the function for which it was designed, which is basically to pump water from receptacle 18 through drains 22, into heating module 60, and back into receptacle 18 through jets 20. When in a non-actuated state, pump 12 does not draw any current from the controller 30 and thus does not perform any pumping action.

The control system is operative for monitoring and controlling the various components of the spa system 10. The control panel 32 of the control system is typically in the form of a user interface that allows a user to enter commands for controlling the various operational settings of the spa. Some non-limiting examples of operational settings of the spa include temperature control settings, jet control settings, and lighting settings. In a non-limiting embodiment where the spa is connected to entertainment and/or multimedia modules, the operational settings of the spa may also include audio settings and video settings, amongst others. Consequently, the expression "operational settings", for the purpose of the present invention, is intended to cover operational settings for any suitable equipment that can be used by a spa bather.

The control system receives electrical power from an electric power source 29 that is connected to the controller 30 via service wiring 31. The controller 30 is then able to control the distribution of power supplied to the various spa components on the basis of control signals received from the various sensors 70 and the control panel 32 in order to cause the desired operational settings to be implemented. Amongst other functions, the controller 30 is adapted to control the power supplied to each spa component such that it acquires the actuated or non-actuated state. In a non-limiting implementation, the power source 29 is connected to the controller 30 via service wiring 31 which is passed through a ground fault circuit interrupter (GFCI) 86. The GFCI 86 is adapted for tripping in the presence of a current leakage to the ground. The ground fault circuit interrupter (GFCI) 86 provides an added safety measure to the spa system.

The power source 29 supplies the controller 30, via service wiring 31, with any conventional power service suitable for residential or commercial use. In a non-limiting implementation, the power source 29 can supply 240 volts (V) AC to the controller 30 via service wiring 31. In an alternative non-limiting implementation, the power source 29 can supply 120 volts (V) AC to the controller 30 via service wiring 31. In an alternative non-limiting implementation, the power source 29 can supply 120 Volts and 240 Volts AC to the controller 30 via service wiring 31. It is to be appreciated that other voltage supply values or voltage supply combinations, for example depending on geographical location, are possible without detracting from the spirit and scope of the invention.

In operation, the various components of the spa system 10 will either be in a respective actuated state or in a respective non-actuated state, with each component in an actuated state drawing a certain current from the controller 30. Accordingly, the total electrical current drawn by the spa system 10 at any point in time will be dependent on which components are in the actuated state and which components are in the non-actuated state. More specifically, the total electrical current drawn by the spa system 10 at any point in time will be essentially the sum of the respective electrical current drawn by each spa component in an actuated state. Hence, the electrical current supplied by the power source 29 to the controller 30 via service wiring 31 can be monitored in order to derive information relating to the operational state of the spa system 10 in general or of particular components of the spa system 10.

Figure 2:
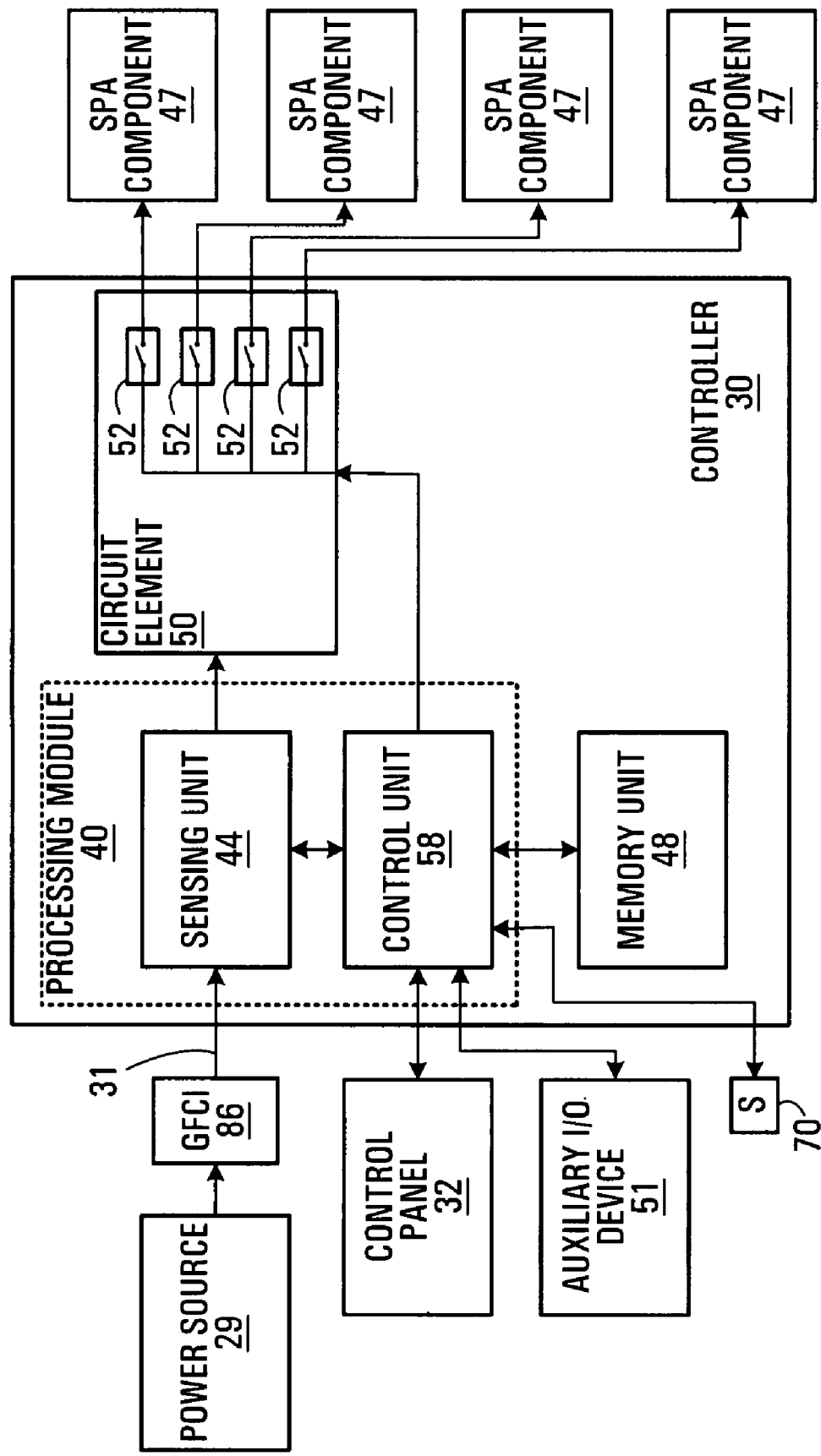
FIG. 2 is a block diagram of the controller of FIG. 1 in accordance with a specific example of implementation of the present invention.

Referring now to FIG. 2, a block diagram of a controller 30 in accordance with a specific example of implementation is illustrated. The controller 30 includes a processing module 40, a memory unit 48 in communication with the processing module 40, and a circuit element 50 that is adapted to convert power received from the power source 29 via service wiring 31 into a particular voltage and/or current to be supplied to a given spa component 47 connected to the controller 30. Amongst other elements, the circuit element 50 includes a set of actuators 52, such as switches, relays, contactors, or triacs, each adapted to enable or prevent the flow of an electrical current to a respective component 47 of the spa system 10.

The memory unit 48 stores measurements indicative of electrical currents drawn by the bathing system under normal operating conditions, each measurement being indicative of the electrical current being drawn by a respective bathing unit component when in the actuated state. The measurements stored in memory unit 48 are the expected measurements for the bathing unit components when in the actuated state and when operating under normal operational conditions. The processing module 40 is also adapted for modifying the measurements indicative of electrical currents drawn by the bathing system stored in the memory unit. The processing module is in communication with the memory unit 48 and is adapted for detecting an abnormal operational condition associated with the bathing system at least in part on the basis of measurements stored on the memory unit 48.

In a first non-limiting implementation, the controller 30 includes a port for receiving a signal conveying measurements associated to the bathing system under normal operating conditions. The port may include either a wireless interface or a wire-line interface without detracting from the spirit of the invention. The processing unit is adapted for modifying the measurements indicative of electrical currents drawn by the bathing system stored in the memory unit on the basis of the signal received. This allows for example an auxiliary I/O device 51 to upload measurement data to the processing module 40 such as to cause the measurement values in the memory unit 48 to be modified.

In a second non-limiting implementation, the processing module 40 is adapted for acquiring a self-programming state and a monitoring state.

In the self-programming state, the processing module 40 is operative for obtaining measurements indicative of electrical currents drawn by the spa system 10, each measurement being indicative of the electrical current being drawn by a respective component 47 of the spa system 10 when the component is in an actuated state. The processing module 40 is further operative for storing the obtained measurements in the memory unit 48. In an alternative implementation, in the self-programming state the processing unit being also obtains measurements indicative reaction times associated to the actuators in circuit element 50 and stores the measurements in the memory unit 48.

In the monitoring state, the processing module 40 is operative for detecting an abnormal operational condition associated with the spa system 10 at least in part on the basis of measurements stored in the memory unit 48.

In the non-limiting example of implementation shown in FIG. 2, the processing module 40 includes a sensing unit 44 and a control unit 58. The sensing unit 44 is adapted for obtaining measurements indicative of the electrical current being drawn by the spa system 10. The sensing unit 44 is adapted to measure the current drawn by the spa system 10 and to generate a signal indicative of the measured current, the generated signal being transmitted to the control unit 58. Upon receiving the signal generated by the sensing unit 44, the control unit 58 is adapted to process the received signal in order to extract the information indicative of the electrical current drawn by the spa system 10. The control unit 58 is also adapted to store the extracted information in the memory unit 48 such that the information may be used by the processing module 40 at a later time. The memory unit 48 may be implemented using any suitable memory device such as an EPROM, EEPROM, RAM, FLASH, disc or any other suitable type of memory device. In a preferred implementation, the memory device 48 includes a non-volatile memory component and the control unit 58 stores the extracted information in the non-volatile memory component of memory unit 48. As further detailed below, the extracted information is used in the self-programming state and in the monitoring state of the processing module 40.

The control unit 58 is also adapted to receive command signals from the control panel 32 in response to user input commands entered at the control panel 32 and from the various sensors 70 in the spa system 10. Optionally, the control unit 58 may also be adapted to communicate with an auxiliary I/O device 51, such as a laptop, a PDA or a cellular phone to receive command signals therefrom or to transmit information to be conveyed to a human. The control unit 58 may communication with auxiliary I/O device 51 over a wireless link or a wire-line link without detracting from the spirit of the invention. For example, the link between the auxiliary I/O device 51 and the control unit 58 can be configured to be used as a serial link such as RS-232, RS-485 or other serial link standard. In an alternative example, the link between the auxiliary I/O device 51 and the control unit 58 may be a wireless link such as a RF or IR link. In such an alternative example, the controller 30 includes a transmitter adapted to transmit signals over the wireless link to auxiliary I/O device 51. The auxiliary I/O device 51 is equipped with a corresponding wireless receiver to receive the signals transmitted by the controller transmitter. The control unit 58 is in communication with the circuit element 50 and is adapted to control the operation of each of the various actuators 52 of the circuit element 50 such as to enable or prevent the flow of an electrical current to a respective component 47 of the spa system 10. In other words, the control unit 58 is adapted to control the circuit element 50 such as to cause any given spa component 47 connected to the controller 30 to acquire an actuated state or a non-actuated state on the basis of the signals received from the control panel 32, the sensors 70 and (optionally) the auxiliary I/O device 51. In a non-limiting implementation, the controller 30 maintains a list of the spa component 47 in the system 10 with their respective current desired states.

Although they are shown as separate elements, it is to be understood that the functionality of the sensing unit 44 and the control unit 58 could be integrated into a single element without departing from the spirit and scope of the present invention. It will be also appreciated that the functionality of the processing module 40 may be implemented as a programmable logic block or by using any suitable hardware, software or combination thereof. Similarly, the processing module 40 and the memory unit 48 can be integrated into a single physical element or be implemented as distinct elements without detracting from the spirit and scope of the present invention. Moreover, it is also to be understood that the processing module 40, the memory unit 48, and the circuit element 50 could be part of a single printed-circuit board mounted within the housing of the controller 30.

The sensing unit 44 may be embodied in any suitable sensing circuit adapted for obtaining measurements associated to current, voltage or to both current and voltage. In a specific embodiment, the sensing unit 44 includes a current sensor adapted to measure the current drawn from the power source 29 by the spa system 10 via service wiring 31 and to generate a signal indicative of the measured current. The sensing unit 44 may also include a voltage sensor to measure the voltage being supplied by the power source 29 and a phase detection circuit to measure the phase between the current drawn from and the voltage supplied by the power source 29. Such current sensors, voltage sensors and phase detection circuits are well known and understood by those skilled in the art and thus will not be described any further in the present description. It will be appreciated that the sensing unit 44 may be adapted for measuring the AC values of the voltage or, alternatively, the sensing unit 44 may be connected on the secondary side of an AC/DC transformer and obtain a DC measurement of the voltage. In such the alternative implementation, the control unit 58 may be adapted to derive the equivalent AC voltage on the basis of the DC voltage measurement.

Figure 9:
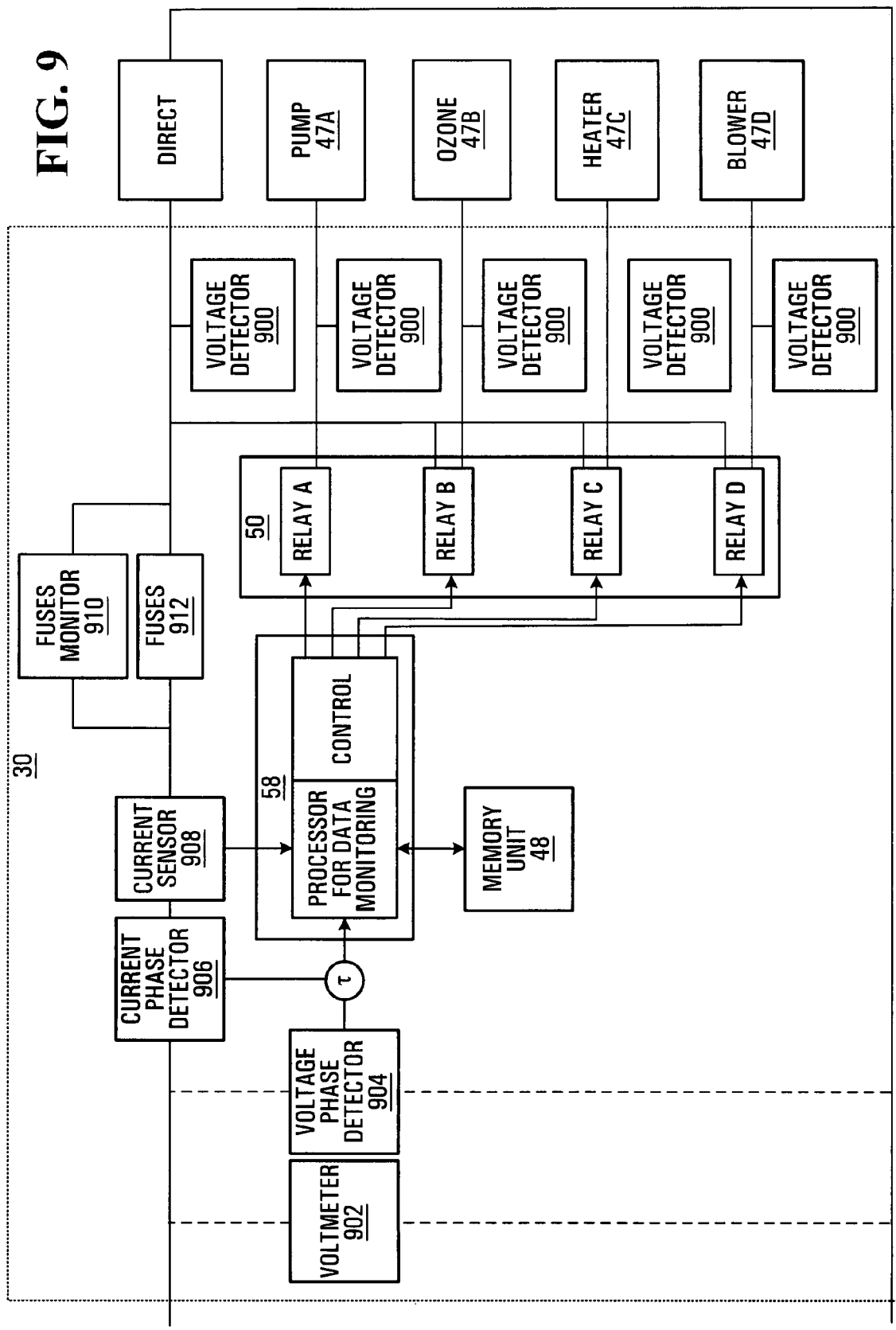
FIG. 9 is a block diagram of the controller of FIG. 1 in accordance with a non-limiting example of implementation of the present invention.

FIG. 9 of the drawings shows a non-limiting alternative example of implementation of the controller 30 having a sensing unit comprising a voltmeter 902, a voltage phase detector 904, a current phase detector 906, a current sensor 908, a fuse monitor 910 and a plurality of voltage detectors 900 associated to respective spa components 47a-47d. The various devices of the sensing unit are adapted for providing control unit 58 with various operational parameters of the spa system. It will be appreciated that embodiments of the sensing unit including fewer or additional devices are possible without detracting from the spirit of the invention. In addition, the components of the sensing unit may be distributed without detracting from the spirit of the invention.

In an embodiment in which the sensing unit 44 includes a current sensor, a voltage detector, and a phase detection circuit, the signal generated by the sensing unit 44 and transmitted to the control unit 58 includes information conveying the magnitude of the current drawn by the spa system 10, the magnitude of the voltage supplied to the spa system 10, and the phase between the drawn current and the supplied voltage. The control unit 58 extracts and uses the current, voltage and phase information conveyed by the signal in order to establish the real and reactive components of the current drawn by the spa system 10 and the voltage supplied thereto. Optionally, the current, voltage, and phase information contained in the signal generated by the sensing unit 44 are processed in order to establish the real and reactive components of the power supplied to the spa system 10 along with the power factor of the system. Mathematically, the relationship between the various current, voltage, power and phase measures can be expressed by the following equations:

$$I_{real} = I_{rms}\cos\theta = \frac{I}{\sqrt{2}}\cos\theta \qquad I_{reactive} = I_{rms}\sin\theta = \frac{I}{\sqrt{2}}\sin\theta \qquad (1)$$

$$V_{real} = V_{rms}\cos\theta = \frac{V}{\sqrt{2}}\cos\theta \qquad V_{reactive} = V_{rms}\sin\theta = \frac{V}{\sqrt{2}}\sin\theta \qquad (2)$$

$$P_{real} = V_{rms}I_{rms}\cos\theta = \frac{VI}{2}\cos\theta \qquad P_{reactive} = V_{rms}I_{rms}\sin\theta = \frac{VI}{2}\sin\theta \qquad (3)$$

$$pf = \cos\theta \qquad (4)$$

where $I_{real}$ is the real current and $I_{reactive}$ is the reactive current drawn by the spa system 10; $V_{real}$ is the real voltage and $V_{reactive}$ is the reactive voltage supplied to the spa system 10; $P_{real}$ is the real power and $P_{reactive}$ is the reactive power supplied to the spa system 10; and pf is the power factor of the system. As can be seen by the above noted equations, each of the above measures may be obtained on the basis of measurements of either the rms (root-mean-square) value $I_{rms}$ or the peak value I of the current drawn by the spa system 10, of either the rms value $V_{rms}$ or the peak value V of the voltage supplied to the spa system 10, and of the phase θ between the measured current and voltage. Consequently, the sensing circuit may be adapted for providing either one of these measurements to the control unit 58 since the remaining measurements may be derived on the basis of the above described equations. For the purpose of the remainder of this specification, a sensing circuit 44 adapted for obtaining a current measurement will be described. It will be readily appreciated that the description below also applies when the sensing circuit 44 is adapted for obtaining voltage and phase measurements.

As mentioned previously, the control unit 58 is adapted to process the received signal from the sensing unit 44 in order to extract the information conveyed by the signal. In an embodiment in which the sensing unit 44 includes only a current sensor, the extracted information will convey the current drawn by the spa system 10. In an embodiment in which the sensing unit 44 includes a current sensor, a voltage detector, and a phase detection circuit, the extracted information will convey the current drawn by the spa system 10, the voltage and power supplied to the spa system 10, and the power factor of the system.

As will now be described, the control unit 58 is configured such as to allow the processing module 40 to acquire a self-programming state and a monitoring state.

Self-Programming State

In the self-programming state, the processing module 40 obtains information indicative of the electrical current drawn by each particular component 47 of the spa system 10 that is connected to the controller 30 when that particular component is in an actuated state. In other words, in the self-programming state, the processing module 40 obtains a set of measurements indicative of electrical currents drawn by the spa system 10, each measurement being indicative of the electrical current being drawn by a respective component 47 when in the actuated state. Optionally, voltage measurements, phase measurements, actuator de-actuation/actuation delays and power factor measurements may also be obtained during the self-programming state. The measurements are obtained by the sensing circuit 44 and processed by the control unit 58. Furthermore, the obtained measurements are stored in the memory unit 48 so that they can be retrieved and used by the processing module 40 at a later time. For example, when the processing module 40 is in the monitoring state, as described further below, it makes use of the information stored in the memory unit 48 in order to detect an abnormal operational condition with the spa system 10.

Optionally, during manufacturing of the controller 30, the maximum allowable current rating of each output of the controller 30 can be stored in the memory unit 48. Now, by monitoring the current being supplied to each spa component 47, the processing module 40 consequently has knowledge of the current passing through the respective output to which each spa component 47 is connected. The processing module 40 can thus determine if the current passing through each output of the controller 30 is below the maximum allowable current rating of the output and, if this is not the case, can control the operation of the circuit element 50 such as to prevent power from being supplied to the spa component 47 connected to the output. Accordingly, this prevents permanent damage to the controller 30 as a result of electrical currents above the maximum allowable current rating of the outputs of the controller 30.

Figure 3:
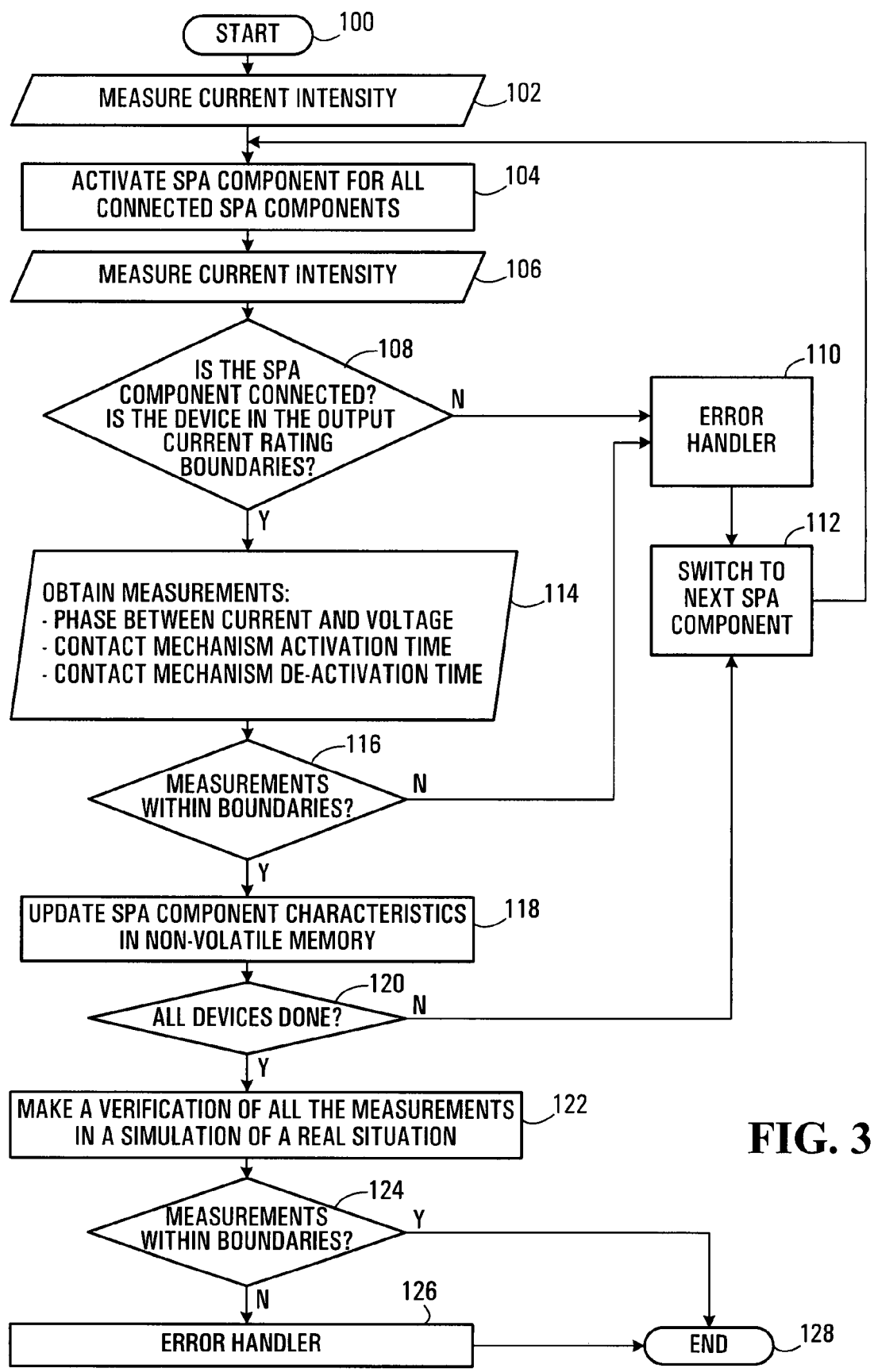
FIG. 3 is a flowchart representing a specific implementation of a process implemented by the controller of FIG. 2 when the latter is in the self-programming state in accordance with a specific non-limiting embodiment of the present invention.

FIG. 3 is a flowchart representing a specific non-limiting implementation of processes implement in the self-programming state of the processing module 40. It is to be understood that a myriad of other implementations of the self-programming state can be employed without departing from the spirit and scope of the present invention. Such alternative implementations will become apparent to the person skilled in the art in light of the present specification and as such will not be described further here.

With reference to FIG. 3, at step 100, the processing module 40 enters the self-programming state. In a particular embodiment, this step is automatically executed upon powering of the spa system 10. In an alternative embodiment, this step may be executed at any time upon reception by the processing module 40 of a signal indicative of an explicit command to enter the self-programming state. The signal could be generated in response to an explicit command entered, for instance, at the control panel 32 or at the auxiliary I/O device 51 in communication with the processing module 40. In yet another alternative embodiment, this step may be executed periodically at a predetermined period. In yet another alternative embodiment, the self-programming can be done during the normal operation of the spa system. For example, the processing module 40 could monitor the first five (5) times that each spa component is turned ON or OFF and obtain measurements for that specific spa component. These measurements will then be store in memory 48. This alternative embodiment has the advantage to not interfere with the normal operation of the spa system. Upon completion of this step, the processing module 40 proceeds to step 102. At step 102, the processing module 40 obtains a measurement of the current intensity for the spa system 10. At step 104, a selected spa component 47 in the set of spa components is caused to acquire the actuated state. For instance, this can be achieved by the control unit 58 controlling the operation of the circuit element 50 such as to allow power to be supplied to the desired spa component 47. Optionally, the spa components in the set of spa components, other that the selected spa component, are caused to acquire the de-actuated state. It will be appreciated that the spa components in the set of spa components, other that the selected spa component need not be de-actuated in all implementations. For instance it is possible to derived measurements associated with the selected spa component by taking a difference between the current measurement prior to actuation of the selected spa component and subsequent to the actuation thereof. In yet another alternative implementation, the selected spa component may originally be in the actuated state and be de-actuated at step 104. The current measurement to be attributed to the selected spa component is again the difference between the current measurement prior to de-actuation of the selected spa component and subsequent to the de-actuation thereof. Therefore, by toggling between the actuated state and the de-actuated state, a current measurement to be attributed to the selected spa component can be obtained.

At step 106, the processing module obtains a measurement of the current intensity to be attributed to the selected spa component. At step 108, the processing module 40 performs a set of tests to determine if the spa component 47 is properly connect to the controller 30. In a non-limiting implementation, the processing module 40 compares the current intensity measured prior to the actuation of the spa component 47 and the current intensity measured subsequent the actuation of the spa component to determine if the current intensity to be attributed to the spa component 47 lies within a current boundary. In a non-limiting example of implementation, the current boundary is a range of acceptable current measurement values.

Optionally, the processing module 40 is adapted for compensating the range of acceptable current measurement values on the basis of a voltage measurement taken at the power input. More specifically, a voltage variation at the power source will affect the current being drawn by each bathing component. Therefore, in accordance with a non-limiting implementation, the processing unit 40 is adapted for obtaining measurements indicative of electrical voltages applied to the bathing system and for deriving a data element conveying a variation in the electrical voltage applied to the bathing system from the nominal input voltage. The variation in the electrical voltage applied to the bathing system from the nominal input voltage is processed to derive a corresponding adjusted range of acceptable current measurement values. As such if the voltage applied is rated at a 240V nominal and the input voltage drops to 220V for some type of loads, the current drawn should also drop in the same proportion. The processing unit 40 makes use of the measurement of the voltage at the supply end to make a correction to the expected range of acceptable current measurement values to derive adjusted range of acceptable current measurement values.

Figure 4:
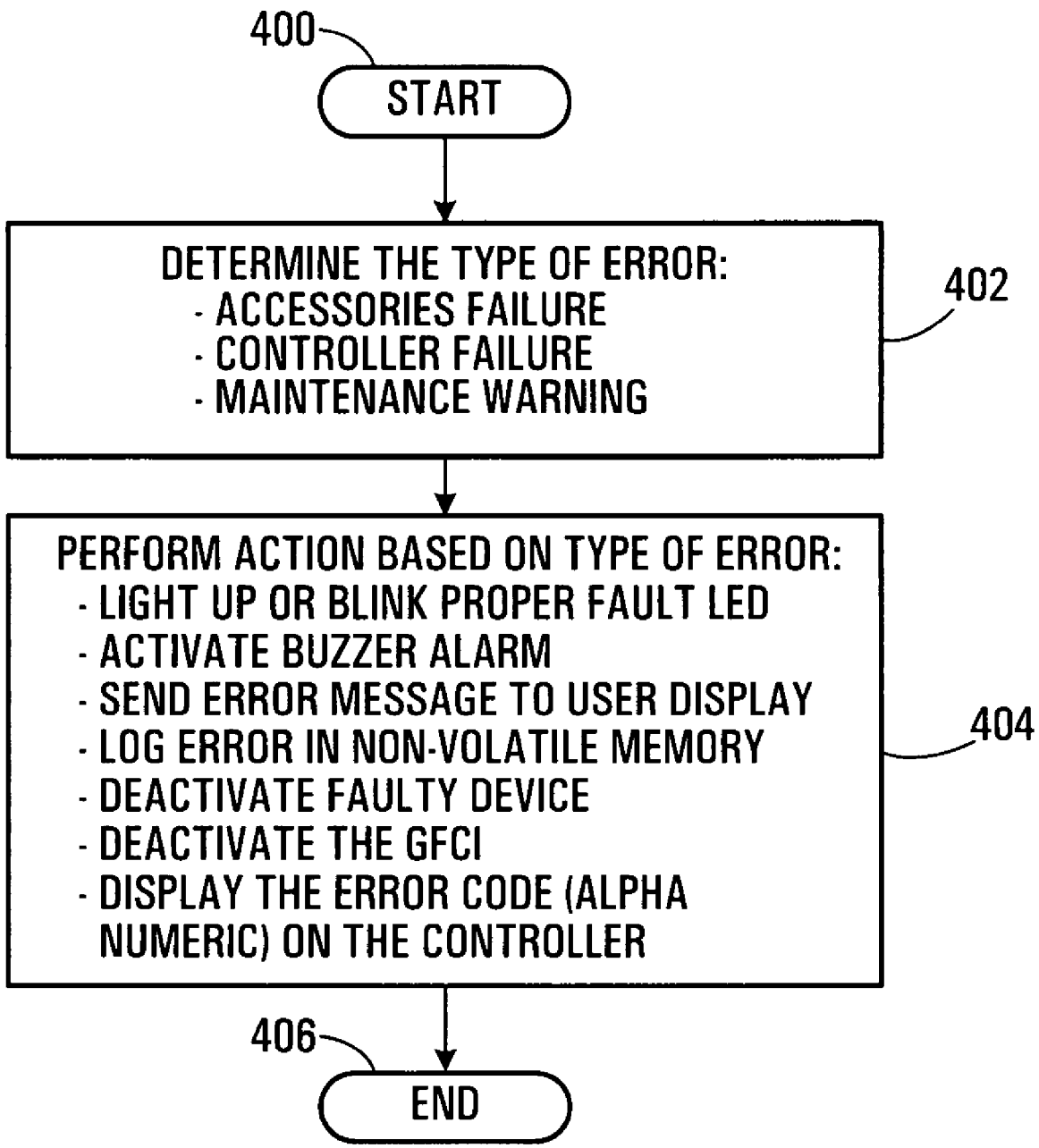
FIG. 4 is a flowchart representing a specific implementation of a error handling process implemented by the controller of FIG. 2 in accordance with a specific non-limiting embodiment of the present invention.

If the tests applied at step 108 are not passed successfully, meaning that the current intensity to be attributed to the spa component 47 does not lie within the current boundary, the system proceeds to step 110 where an error handling process is initiated. The error handling process will be described in greater detail further on in the specification with reference to FIG. 4.

If the tests applied at step 108 is passed successfully, meaning that the current intensity to be attributed to the spa component 47 lies within the current boundary, the system proceeds to step 114.

At step 114, the processing module 40 obtains a plurality of the measurements. The types of measurements obtained will differ from one implementation to another and will be affected by the functionality of the sensing unit 44. Accordingly, although the specific implementations of the self-programming state of the processing module 40 are adapted to obtain and store information indicative of the electrical current drawn by each component 47 of the spa system when in an actuated state, it will be appreciated that, in other implementations, the processing module 40 may be operative to obtain and store information indicative of any suitable desired parameter suitable to be conveyed by a signal generated by the sensing unit 44. For example, the sensing unit 44 may be configured to include a current sensor, a voltage detector to measure the voltage being supplied by the power source 29 and a phase detection circuit to measure the phase between the current drawn from and the voltage supplied by the power source 29. Consequently, the signal transmitted by the sensing unit 44 may include any combinations of electrical parameters for transmission to control unit 58. In a specific example of implementation, the control unit 58 extracts the information contained in the signal generated by the sensing unit 44 and processes that information to extract therefrom the following information data elements:

The reactive current component through the selected spa component;

The real current component through the selected spa component;

The voltage across the selected spa component;

The input power source voltage;

The phase between the current through the spa component and the voltage across the spa component;

The power factor associated to the spa component;

The inrush current associated with the selected spa component 47. The expression "inrush current" is used to designate the maximum electrical current drawn by a spa component 47 upon powering up, i.e., upon toggling from a non-actuated state to an actuated state;

The current stabilization time required by the selected spa component 47 in order for it to draw a stable current after having acquired the actuated state.

The actuator actuation time delay (closing time for a relay). This is the delay between the time the control unit 58 issues an "actuate" command to the actuator corresponding to the selected spa component and the time is takes for the actuator to cause the selected spa component to acquire the actuated state from a de-actuated state;

The actuator de-actuation time delay (opening time for a relay). This is the delay between the time the control unit 58 issues an "de-actuate" command to the actuator corresponding to the selected spa component and the time is takes for the actuator to cause the selected spa component to acquire the de-actuated state from an actuated state.

In will be appreciated that in order to obtain certain ones of the above noted measurements, the control unit 58 may need to cause the actuator corresponding to the selected spa component to be actuated and de-actuated. Once the desired measurements have been obtained, the system proceeds to step 116.

At step 116, the measurements obtained at step 114 are compared to reference measurements to determine whether the measurements are reasonable. In a non-limiting example of implementations, the measurements obtained at step 114 are compared to acceptable ranges of measurements. If the measurements obtained at step 114 do not lie within the acceptable ranges of measurements, then the system proceeds to step 110 where an error handling process is initiated. The error handling process will be described in greater detail further on in the specification with reference to FIG. 4. If the measurements obtained at step 114 lie within the acceptable ranges of measurements then the system proceeds to step 118.

Optionally, at step 116, the control unit 58 processes the measurements obtained at step 114 to associate the selected spa component with a corresponding spa component type selected from a set of spa component types. In effect, it will be understood by those skilled in the art that electrical parameters are different for each type of spa components, such as a pump, a heater, a power supply or a blower, and are even different for each model of spa component in a given type of spa components. Accordingly, in this variant, memory unit 48 is adapted to store a set of electrical parameters for a respective types of spa components and, optionally, for a set of models of each type of spa component. The control unit 58 accesses the set of electrical parameters of each spa component type from the memory unit 48 and compares the set of electrical parameters to the measurement obtained at step 114 in order to associate the selected spa component to a certain type of spa component. Optionally, on the basis of the identified associated type of spa component, the controller 30 is operative to configure itself to associate each one of its connectors to the corresponding identified type of spa component. In other words, a human operator, such as a spa manufacturer or spa technician, does not need to manually configure the controller 30 in order to program into the controller 30 knowledge of the specific type of spa component that is connected to each one of its connectors.

At step 118, the processing unit updates the characteristics of the selected spa component in memory unit 48 with the measurements obtained at step 114. Preferably, the measurements obtained at step 114 are stored in a non-volatile portion of memory unit 48 such that the measurements will remain on the memory unit 48 in the event the controller is powered down. In a non-limiting implementation, the control unit 58 stores in the memory unit 48 the measurements as established in step 114 along with an identifier for the selected component 47. The identifier of the selected component 47 could be, for example, the connector of the controller 30 to which the selected component 47 is connected. The system then proceeds to step 120.

At step 120, the processing unit 40 determines if there is another component 47 of the spa system 10 that is connected to the controller 30 and that has not yet been selected. If there are spa components that have not yet been processed, the system proceeds to step 112 where a next spa component is selected and then the process repeats itself at step 104 for the newly selected spa component. If at step 120, all spa components in the spa system have been processed, the system proceeds to step 122.

At step 122, a verification of the measurement stored in the memory unit 48 is effected by simulating a real spa system usage situation. For example, a set of spa components may be sequentially actuated and de-actuated and actual measurements of the type obtained at step 114 are obtained based on a simulated spa system usage situation. At step 124, the measurements obtained at step 122 are compared to the measurements stored in the memory unit 48. If the measurements obtained at step 122 are not substantially similar to those in memory unit 48, the system proceeds to step 126 where an error handling process is initiated. The error handling process will be described in greater detail further on in the specification with reference to FIG. 4. If the measurements obtained at step 122 are substantially similar to those in memory unit 48, the system proceeds to step 128.

It will be appreciated that steps 122, 124 and 126 provide an additional verification feature to verify if the measurements taken are proper. These steps, namely steps 122, 124 and 126, may be omitted without detracting from the spirit of the invention.

The system then proceeds to step 128 where the system exits the self-programming state.

As indicated above, the measurements obtained and stored by the processing module 40 during the self-programming state is utilized in the monitoring state of the processing module 40, which is described herein below.

It will be appreciated that certain embodiments of the processing module 40 may omit the self-programming state. In such a variant, the memory unit 48 may be pre-programmed with data conveying operational electrical parameters associated to respective spa components in the spa system. In other implementations, the controller may include a port for receiving signals conveying measurements associated to the bathing system under normal operating conditions. The port may include either a wireless interface or a wire-line interface without detracting from the spirit of the invention. The measurements indicative of electrical currents drawn by the bathing system stored in the memory unit 48 may then be modified on the basis of the signal received. This allows for example an auxiliary I/O device 51 to upload measurement data to the processing module 40 such as to cause the measurement values in the memory unit 48 to be modified. In yet another embodiment, the memory unit 48 may be directly programmable by an auxiliary I/O device and the processing module 40 may be by-passed during the programming operation.

The Monitoring State

In the monitoring state, the processing module 40 is operative for detecting an abnormal operational condition associated with the spa system 10 at least in part on the basis of measurements stored in the memory unit 48. An abnormal operational condition associated with the spa system 10 means that one or multiple components 47 of the spa system 10, the controller 30, one or more fuses 912 or components of the circuit element 50 are operating in conditions that do not correspond to their respective normal operating conditions, or are not operating when they should be operating.

An abnormal operational condition associated with the spa system 10 can result, for example, from an operational failure in one or multiple spa components 47, from the controller 30, from an operational failure in one or more actuators in the circuit element 50 and from an operational failure of a fuse (not shown) in circuit element 50 for example. An abnormal operational condition associated with the spa system 10 could also result from a decrease in operational efficiency of one or multiple spa components 47 due to wear of the components in time.

When such an abnormal operational condition is experienced by the spa system 10, the electrical parameters of the spa system, including the electrical current drawn by the spa system 10, will vary. As described above, the memory unit 48 stores information indicative of various electrical parameters associated with each spa component 47 when in an actuated state, including the electrical current drawn by a respective component 47 when in its actuated state. In the monitoring state, the processing module 40 monitors various measurements including the electrical current drawn by the spa system 10 and utilizes the information stored in the memory unit 48 in order to detect an abnormal operational condition associated with the spa system 10. The processing module 40 is operative to identify the particular spa component(s) 47 that is (are) causing the detected abnormal condition. Optionally, the processing module 40 is operative to de-actuate the particular spa component(s) 47 that is (are) causing the detected abnormal condition.

In a specific implementation of the monitoring state, the processing module 40 is operative for deriving an expected measurement of a current drawn by the spa system 10 at least in part on the basis of a set of actuated spa components 47 and the measurements stored in the memory unit 48. The processing module 40 also obtains an actual measurement of a current drawn by the spa system 10 and determines if the spa system 10 is experiencing an abnormal operational condition at least in part on the basis of the expected measurement of the current drawn by the spa system 10 and the actual measurement of the current drawn by the spa system 10.

Optionally, the processing module 40 is adapted for compensating the expected current measurement value on the basis of a voltage measurement taken at the power input. More specifically, a voltage variation at the power source will affect the current being drawn by each bathing component. Therefore, in accordance with a non-limiting implementation, the processing unit 40 is adapted for obtaining measurements indicative of electrical voltages applied to the bathing system and for deriving a data element conveying a variation in the electrical voltage applied to the bathing system from the nominal input voltage. The variation in the electrical voltage applied to the bathing system from the nominal input voltage is processed to derive a corresponding adjusted expected current measurement value. As such if the voltage applied is rated at a 240V nominal and the input voltage drops to 220V for some type of loads, the current drawn by that load should also drop in the same proportion. The processing unit 40 makes use of the measurement of the voltage at the supply end to make a correction to the expected current measurement value to derive adjusted expected current measurement value.

Figure 5:
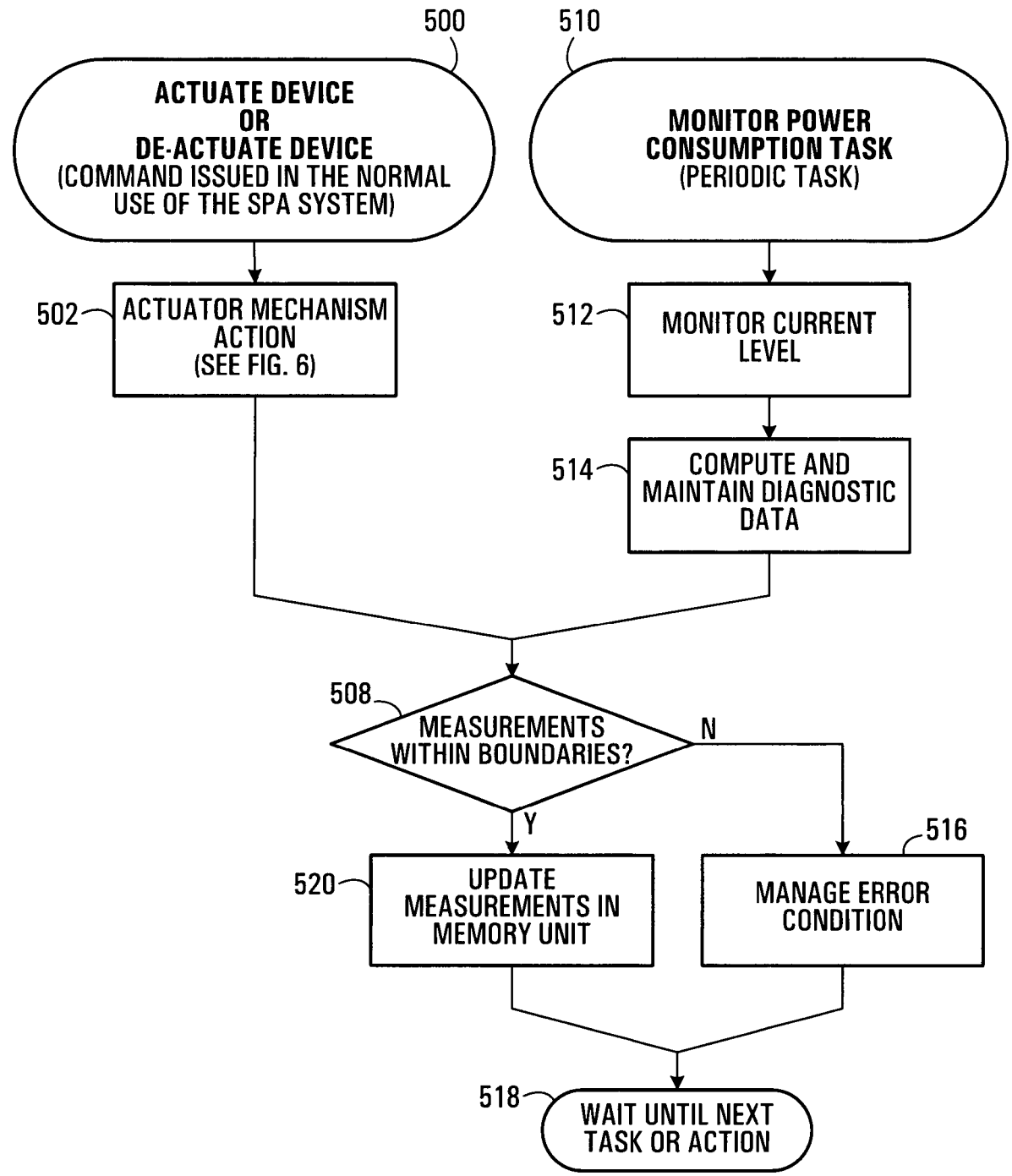
FIG. 5 is a flowchart representing a specific implementation of a process implemented by the controller of FIG. 2 in accordance with a specific non-limiting embodiment of the present invention.

FIG. 5 is a flowchart representing a non-limiting example of steps involved in a specific implementation of the monitoring state of the processing module 40. It is to be understood that a myriad of other implementations of the monitoring state can be employed without departing from the spirit and scope of the present invention. Such alternative implementation will become apparent to the person skilled in the art in light of the present specification and as such will not be described further here.

As depicted, the monitoring state includes two streams, a first stream beginning at step 500 and a second stream beginning at step 510.

At step 500, the first stream of the monitoring state is initiated when a spa component is actuated or de-actuated on the basis of a signal received from the control panel 32 or auxiliary I/O device 51 in the course of normal use of the spa system. The first stream of the monitoring state can also be initiated when the controller automatically issues a command to actuate or de-actuate a spa component in response to signals received from sensors in the spa system. Following step 500, the processing module 40 proceeds to step 502.

A step 502, the control unit 58 initiates the actuator mechanism action on the basis of the command received at step 500 in order to actuate (or de-actuate) the corresponding spa component. The actuator mechanism action will be described in greater detail with reference to FIG. 6.

Figure 6:
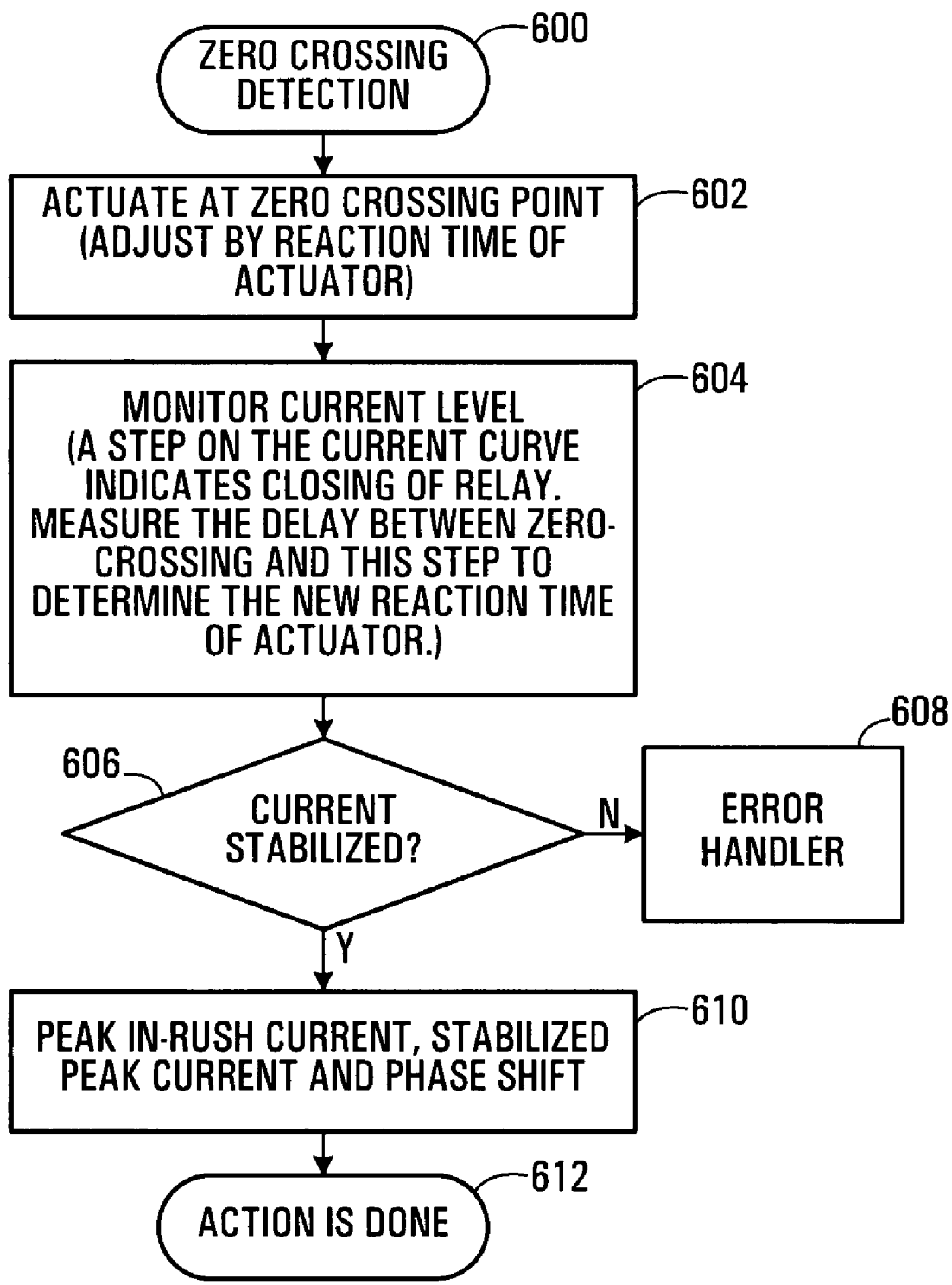
FIG. 6 is a flowchart representing a specific implementation of the actuator mechanism process implemented by the controller of FIG. 2 in accordance with a specific non-limiting embodiment of the present invention.

Generally speaking, to avoid current sparks and to extend the life of an actuator, the actuator should be closed when the voltage across the actuator is near zero and opened when the current at the switch is near zero. It will readily be appreciated that the expression "near zero" referring to the voltage and current is intended to indicate a measure of the voltage and current which is low relative to the peak voltage and current value and not intended to only indicate a voltage or current measure which is exactly nil or 0. As such, in a specific implementation, the processing module 40 monitors the voltage or current supply to determine when the voltage (or current) is near zero. With reference to FIG. 6, at step 600, in the case of an actuation command, the control unit 58 monitors the voltage to be supplied to the spa component to detect the zero crossing point of the voltage. Similarly, in the case of a de-actuation command, the control unit 58 monitors the current supplied to the spa component to detect the zero crossing point of the current.

At step 602, the processing module 40 then uses the opening and closing reaction times of each actuator 52 stored in the memory unit 48, in combination with the information obtained at step 600, in order to determine an optimal time to send a signal to the circuit element 50 for actuating or de-actuating a given spa component 47. Accordingly, the processing module 40 can determine the optimal time to send a signal to the circuit element 50 to actuate a given spa component 47 such that the actuator 52 corresponding to that given component 47 will close when the voltage supplied to the given component 47 approaches zero. Similarly, the processing module 40 can determine the optimal time to send a signal to the circuit element 50 to de-actuate a given spa component 47 such that the actuator 52 corresponding to that given component 47 will open when the current drawn by the given component 47 approaches zero. The processing module 40 then proceeds to step 604. It will be appreciated that step 600 and 602 may be omitted from certain implementations without detracting from the spirit of the invention.

At step 604, the processing module 40 monitors the current supplied to the bathing system. A step, or sudden change in the in the current magnitude being supplied to the bathing system indicates that the actuator has been closed (or opened). Optionally at step 604, the processing module 40 obtains updated measurement associated to the actuator such as, for example, the actuator de-actuation/actuation delays. These updated measurements are stored in a temporary memory for later processing. The processing module 40 then proceeds to step 606.

At step 606, the processing module 40 determines whether the current has reached a stable value. If the current has not reached a stable value after a pre-determined amount of time, the processing module 40 proceeds to step 608 where an error handling process is initiated. The error handling process will be described in greater detail further on in the specification with reference to FIG. 4. If the current has reached a stable value after a pre-determined amount of time, the processing module 40 proceeds to step 610.

Figure 8:
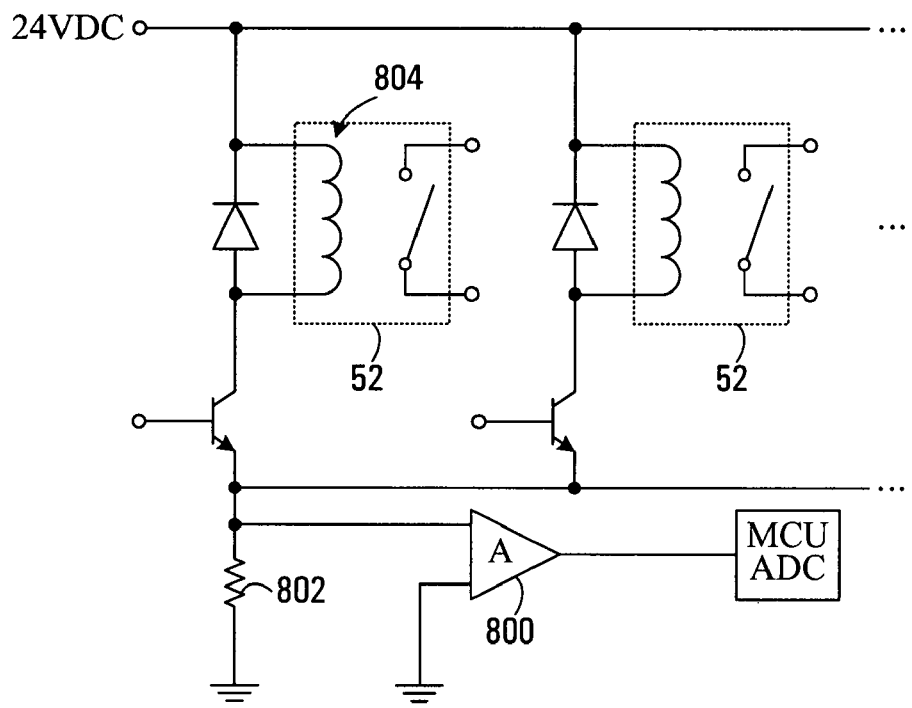
FIG. 8 is a block diagram of a portion of a circuit element suitable for use in the controller depicted in FIG. 2 including a set of relays and respective current sensors in accordance with a specific non-limiting example of implementation of the present invention.

Optionally, circuit element 50 includes a set of current sensors in communication with the processing module 40 for detecting the presence of a current in the actuator. FIG. 8 shows a non-limiting example of implementation of a set of actuators in the form of relays where each relay is associated to a respective current sensor. In a typical interaction, after the actuation of the relay by the processing module 40, a current should be observed in the relay coil. The operational amp 'A' 800 is adapted to measure the voltage drop at the shunt resistance 802 located in series with the relay coil 804. If the current measured in the relay coil 804 is not within an acceptable range, the processing module 40 will detect an abnormal operational condition with the controller 30. The processing module 40 will then proceed to step 608 where an error handling process is initiated. If a suitable current is observed, the processing module 40 proceeds to step 610. It will be appreciated that suitable circuits other than the one depicted in FIG. 8 for measuring a current in a relay may be used without detracting from the spirit of the invention.

At step 610, the processing module 40 obtains updated measurement associated to the spa component which was actuated (or de-actuated) such as, for example, in-rush current measurements, stabilized peak current and phase information amongst others. These updated measurements are stored in a temporary memory for later processing. After step 610 the processing module 40 proceeds to step 612 where the actuator mechanism action is considered to be completed. The processing module 40 then exits step 502 (shown in FIG. 5) and proceeds to step 508.

At step 508, the processing module 40 determines whether the measurements obtained during the actuator mechanism action step 502 and stored in the temporary memory are within an acceptable set of limits of measurements. The limits of measurements are stored in the memory unit 48. In the event that the measurements obtained do not lie within acceptable limits, the processing module 40 proceeds to step 516 where an error handling process is initiated. The error handling process will be described in greater detail further on in the specification with reference to FIG. 4. If the measurements are within acceptable limits, the processing module 40 proceeds to step 514 where the measurements stored in the temporary memory are used to update the measurements stored in the memory unit 48 for use in the next iteration of the monitoring state. The processing module 40 then proceeds to step 518 where the processing module 40 waits for the next initiation of the monitoring state.

At step 510, the second stream of the monitoring state is initiated periodically either at preset time intervals or random intervals. Optionally, the second stream of the monitoring state may also initiated upon reception by the processing module 40 of a signal indicative of an explicit command to enter the monitoring state. The signal could be generated in response to an explicit command entered, for instance, at the control panel 32 or at the auxiliary I/O device 51 in communication with the processing module 40. Following step 510 the processing module 40 proceeds to step 512.

At step 512 the processing module 40 receives diagnostic information from the sensing unit 44 (shown in FIG. 2) and optionally at step 514 maintains a record of the diagnostic information in a memory unit such as memory unit 48. In a non-limiting implementation, at step 512 the processing module 40 is adapted for obtaining actual measurements of the current drawn by the spa system and, optionally, voltage measurements, phase measurements and any other suitable diagnostic measurements. The actual measurements obtained are stored in a temporary memory for later processing. The processing module 40 then proceeds to step 508.

At step 508, the processing module 40 determines whether the actual measurements obtained at steps 512 and 514 are within an acceptable set of limits of measurements. The limits of measurements are stored in the memory unit 48. In a non-limiting implementation, the processing module 40 is adapted for computing an expected measurement of the current drawn that should be drawn by the spa system on the basis of the set of actuated and de-actuated spa components. In a non-limiting implementation, the processing module 40 compares the actual measurement of the current drawn by the spa system 10 to the expected measurement of the current. In a non-limiting implementation, the processing module 40 determines whether or not the actual measurement of the current drawn by the spa system 10 is within a certain range from the expected measurement of the current. The certain range could be expressed in absolute terms (e.g., ±2 amps (A)) or in relative terms as a percentage of the expected measurement of the current (e.g., ±5% of the expected measurement of the current). In the event that the actual measurements obtained do not lie within acceptable expected measurement limits, the processing module 40 proceeds to step 516 where an error handling process is initiated. The error handling process will be described in greater detail further on in the specification with reference to FIG. 4. If the actual measurements are within acceptable expected measurement limits, the processing module 40 proceeds to step 514 where the actual measurements stored in the temporary memory are used to update the measurements stored in the memory unit 48 for use in the next iteration of the monitoring state. The processing module 40 then proceeds to step 518 where the processing module 40 waits for the next initiation of the monitoring state.

Error Handling Process

The above described self-programming state and monitoring state allow the processing module 40 to detect the presence of an abnormal condition associated with the spa system 10. As indicated above, at steps 110 126 (FIG. 3) 516 (FIG. 5) and 608 (FIG. 6), the processing module 40 initiates an error handling process, which will now be described with reference to FIG. 4.

At step 400, the error handling process is initiated and the processing module 40 proceeds to step 402. At step 402, the processing unit 40 identifies a potential cause for at least part of the abnormal operational condition. Identifying a potential cause of at least part of the abnormal operational condition may be effected in a plurality of different manners. The potential cause of the abnormal operational condition may be a component of the spa system or may be a portion of the controller. Optionally, the processing unit 40 may also be adapted for identifying that maintenance is required. The spa component potentially causing at least part of the abnormal operational condition of the spa system may be for example a pump, an air blower, a heater, an ozonator, a CD player, a power supply, a fuse or any other device in the spa system. The portion of the controller potentially causing at least part of the abnormal operational condition of the spa system may be for example one or more burned fuses, an actuator, a defective trace in the PCB board implementing the controller or some other component. The processing module 40 then proceeds to step 404.

Figure 10:
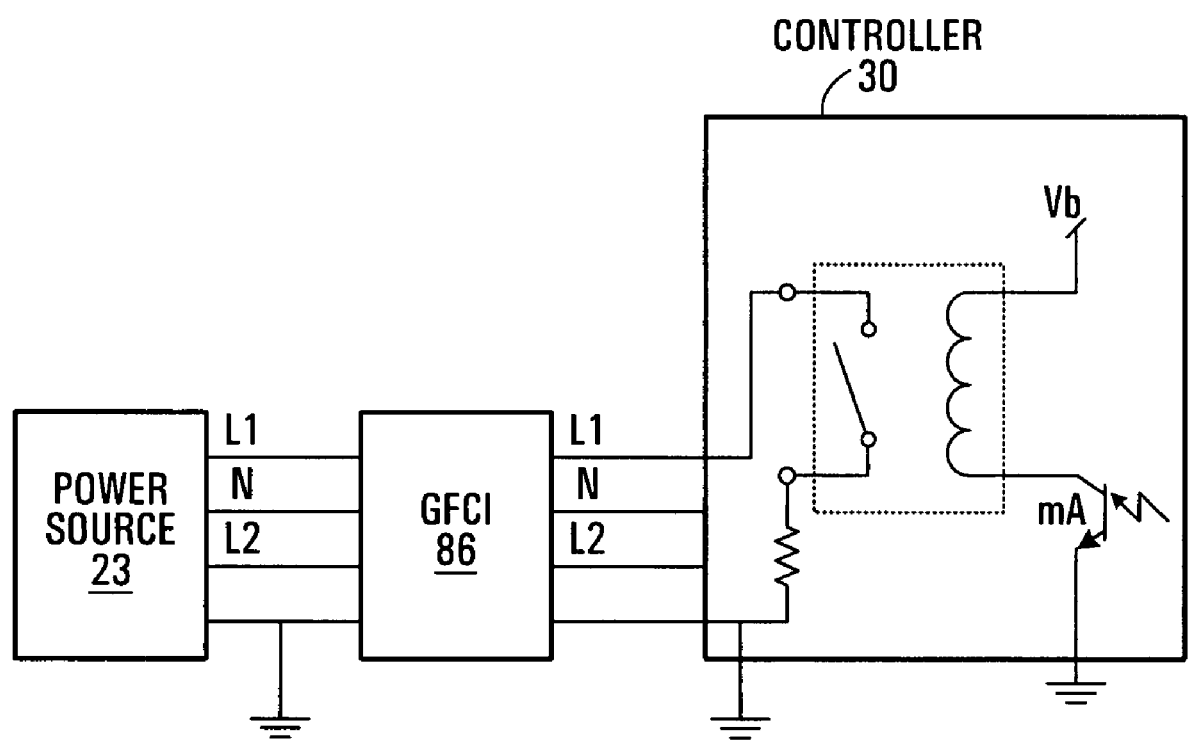
FIG. 10 is a block diagram of a circuit adapted for causing a ground fault circuit interrupter to trip in accordance with a specific non-limiting example of implementation of the present invention.

At step 404, the processing module causes an action to be effected on the basis of the identified potential cause of at least part of the abnormal operational condition. Actions may include:

- de-actuating the device potentially causing at least part of the abnormal operational condition. In a specific example where the device potentially causing at least part of the abnormal operational condition is a spa component, the identified spa system component is caused to acquire the non-actuated state;
- issuing messages conveying the identified potential cause of at least part of the abnormal operational condition. This may be effected by turning ON (or OFF) a appropriate LED or causing an appropriate LED to blink, a display may convey a text message or code to identify the potential cause of the error. Alternatively, a buzzard or other audio message may be issued.
- causing the GFCI breaker 86 (shown in FIG. 1) to trip automatically to removed the power from the controller 30. The breaker tripping may be caused by using appropriate circuitry in communication with the processing module 40. When an abnormal operational condition is detected, a signal is sent from the processing module 40 to the GFCI breaker 86 for causing the latter to trip. In a non-limiting implementation, the circuitry is adapted for causing a current leakage to ground. FIG. 10 shows a non-limiting implementation of circuitry for causing a current leakage to ground such as to cause the GFCI breaker 86 to trip. As depicted, a current leakage to the ground is forced in one of the lines (L1 in FIG. 10) in response to a signal from the controller 30. The GFCI breaker 86 in response to the presence of the current leakage to ground is caused to trip. If will be readily apparent that circuitry other than that depicted in FIG. 10 may be used for causing a breaker to trip in response to an abnormal operational condition for the spa system without detracting from the spirit of the invention;
- logging information in a memory unit indicative of the identified potential cause of at least part of the abnormal operational condition;
- any other suitable action.

In a specific non-limiting implementation, the controller includes an output module in communication with the processing unit 40, the output module is adapted for conveying the abnormal operational condition associated to the bathing system. The output module may include, for example, a visual display element and/or an audio element to respectively convey to a human operator visual and/or audible information indicative of the components identified as a potential cause of the detected abnormal operational condition of the spa system 10. The visual display element could be, for instance, a liquid-crystal display (LCD) or one or more light-emitting diodes (LEDs).

Specific examples of the manner in which the component potentially causing at least part the abnormal operational condition of the spa system may be conveyed include, without being limited to: text messages, alpha and/or numeric codes, audible signals, IR/RF signals, color lights and discrete LEDs amongst others. When the messages are displayed in a visual format, the messages may be displayed anywhere in the spa system or in the proximity of the spa system. For example, the message may be displayed on the controller module, on any component of the bathing system, on a dedicated user interface, on a user operable console of a spa system, on an external direct wire device, on a display device positioned on the skirt of the bathing unit or on a device positioned remotely from the controller and in wireless communication with the controller. In a specific non-limiting implementation, the device may be positioned remotely from the controller and in wireless communication with the controller and can be installed for example inside a house.

Figure 11A:
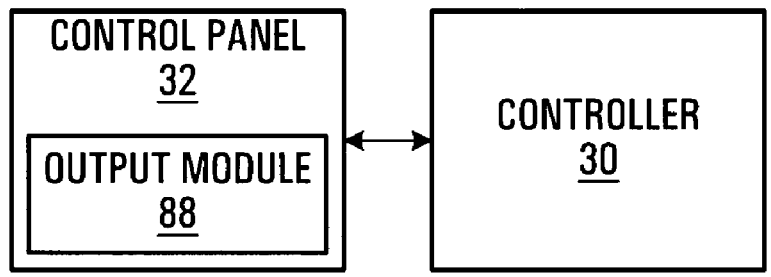
FIGS. 11a-11c are block diagrams of various embodiments of an output module suitable for use with a controller in accordance with specific non-limiting example of implementations of the present invention.
Figure 11B:
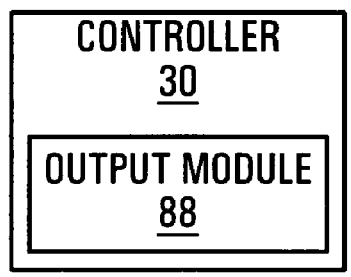

In a non-limiting implementation, of the type shown in FIG. 11*a*, the output module 88 is part of the control panel 32 of the spa system 10. In another non-limiting implementation, of the type shown in FIG. 11*b*, the output module 88 is in the housing of the controller 30 and is concealed from the user under typical operation.

Figure 11C:
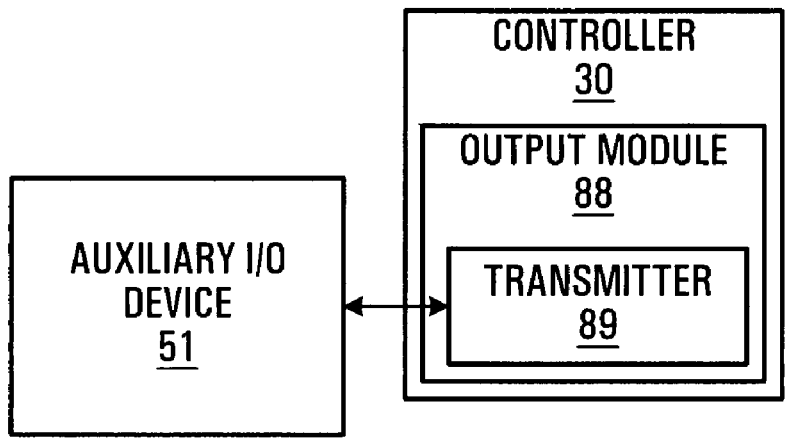

In a specific implementation, shown in FIG. 11*c*, the output module 88 is in the form of a transmitter or transceiver 89 operative to transmit a signal conveying an abnormal operational condition associated to the bathing system. The signal may include information indicative of the identified bathing unit component potentially causing at least part the abnormal operational condition of the bathing system. The transmitter/transceiver is operative to transmit the signal over either one of a wireless link, such as a radio frequency (RF) link or infra-red (IR) link, or alternatively over a wire-line link. The transmitter/transceiver communicates with an auxiliary I/O device 51, such as a laptop, a PDA or a cellular phone to convey information to a human. In a specific non-limiting implementation, the auxiliary I/O device 51 is in the form of a dedicated display module suitable to be positioned inside a house and in wireless communication with the transmitter/transceiver of output module 88. Optionally, the output module 88 is adapted to transmit a signal to processing module 40 to confirm the reception of the signal from the bathing system.

In a non-limiting implementation, where the identified potential cause of at least part of the abnormal operational condition is a spa component, the processing module 40 is operative for causing the identified spa component 47 to acquire a non-actuated state. This can be achieved through the control unit 58 controlling the operation of the circuit element 50 such as to prevent power from being supplied to the particular component (or components) that is (are) causing the abnormal operational condition experienced by the spa system 10. Accordingly, the controller 30 can thus have the capability to identify and de-actuate the particular one or multiple spa components 47 that are operating in conditions that do not correspond to their respective normal operating conditions. This prevents spa components 47, and the controller 30, from being permanently damaged as a result of operation in conditions for which they were not intended to operate in. In this fashion, the processing module 40 can prevent an output of the controller 30 from allowing the passage of a current above its maximum allowable current rating. By de-actuating the spa component potentially causing the abnormal operational condition of the spa system 10, the processing module can prevent the current from exceeding the breaker rating thereby preventing damage to the controller or preventing a fuse to blow.

The table below provides a few non-limiting examples of potential causes of abnormal operational conditions, manners in which these potential causes may be identified and actions to be implemented when a potential cause for the abnormal operational condition has been identified. It will be readily appreciated that the processing module 40 may be adapted for identifying other potential causes of at least part of the abnormal operational condition without detracting from the spirit of the invention by including suitable detection methods.

| Problem Location | Potential Cause of abnormal operational condition | Detection method | Action to take* |
| --- | --- | --- | --- |
| Spa System error | Fuse burned | Fuse detector sends signal to the processing unit 40 indicative of the fuse problem | Send message indicating that the burn fuse is the potential source of the problem |
| | Input current to spa system is higher than the limit | Current draw measure exceeds the total capacity of the input rating store in memory. | Display a message. De-actuate some accessories to correct the situation. |
| | Pump running dry (with no water) | Power factor of the pump at the actuation of the pump is higher than the power factor in the memory unit. | Send message indicating that the pump is the potential source of the problem |
| | Spa component draws abnormal current or wrong spa component connected. | Current sensor detects a current not within the range of the measurements in the memory unit in connection with the connector corresponding to the spa component. | Send message indicating the connector (or the spa component) as the potential source of the problem |
| | Spa component not connected | Current sensor detect no current increase after the actuation of the connector | Send message indicating the spa component as the potential source of the problem |
| | Spa component shorted | Current sensor detect an abnormal high current after the actuation of the spa component | Send message indicating the spa component as the potential source of the problem |
| Controller board damaged | Dielectric breakdown between traces | Abnormal current draw or change in current for no reason. In other words the current sensor will detect a change in the current when no additional spa component has been actuated | Send message indicating error with the controller Display code corresponding to failure Activate the circuitry to make the GFCI trip |
| | Actuator (e.g. relay) failed shorted | Current sensor detects no reduction of the input current after the de-actuation of a spa component. | Send message indicating error with the controller Display code corresponding to failure Activate the circuitry to make the GFCI trip |
| | Actuator (e.g. relay) reaction time not in the range defined in the memory unit. | After the actuation of the actuator, the processing unit will monitor time between the actuation of the relay and the change in the current draw at the input. The time obtained should be within the range that as been stored in memory. | Send message indicating error with the controller Display code corresponding to failure |

In a non-limiting implementation, to identify one or more spa components potentially causing at least part of the abnormal operational condition of the spa system 10, the processing module 40 sequentially toggles the spa components from one of the actuated state and the non-actuated state to the other of the actuated state and the non-actuated state to obtain measurements indicative of electrical currents, each measurement being indicative of an actual electrical current being drawn by a respective component 47 when in the actuated state. The processing module 40 can then process the obtained measurements on the basis of the measurements stored in the memory unit 48 in order to identify at least one spa component 47 potentially causing at least part of the abnormal operational condition of the spa system 10.

In accordance with a variant, processing module 40 is configured to monitor the evolution in time of the electrical current drawn by each spa component 47 in order to monitor the wear experienced by the component. For example, by monitoring variations in time of the reactive and real components of the current drawn by a given spa component 47, the processing module 40 can determine whether the given spa component 47 has experienced a certain level of wear. As another example, an aging pump or a dirty filter will increase Ireactive and Ireal. Similarly, a sudden increase of the power factor gives an indication that something may be blocking the water intake causing a flow reduction in the pump circuit. Upon establishing that a given spa component 47 has experienced a certain level of wear, the processing module 40 can convey this information to a human operator, for instance, via a display module on the control panel 32 or on the auxiliary I/O device 51 (FIG. 2). The human operator is then informed of the potentially worn out spa component 47 and can take appropriate preemptive action, such as repairing or replacing the worn component, before the worn out component experiences an operational failure which could result in significant damage to the spa system 10.

In accordance with another variant, processing module 40 may be configured to monitor the operation of each actuator 52 of the circuit element 50 in order to detect any malfunction of the actuators 52. For instance, the processing module 40 monitors the time taken for each actuator 52 to close (or open) when the corresponding spa component 47 is actuated (or de-actuated). By using the opening and closing reaction times of each switch 52, the processing module 40 can determine if the monitored time taken for a given actuator 52 to close (or open) is within a certain range of the closing (or opening) reaction time stored in the memory unit 48 for that given actuator 52. For example, if the time taken by a given actuator 52 to open exceeds by a certain amount the stored opening reaction time of that given actuator 52, the processing module 40 can determine that the contact elements of that given actuator 52 are damaged or are stuck together. A warning message can then be conveyed to a human operator, for instance, via a display module on the control panel 32 or on the auxiliary I/O device 51 (FIG. 2) such that appropriate preemptive action can be taken.

In accordance with another variant, processing module 40 is configured to monitor the power factor of the spa system 10. Through measurements of the phase between the current drawn by the spa system 10 and the voltage supplied by the power source 29 to the spa system 10, the processing module 40 can directly compute the value of power factor of the spa system 10 and monitor its variation in time. For example, an abnormally high reading of a power factor for a spa component such as a pump, may indicate that the pump is probably running dry (without water). In response to such a situation the processing module may cause a warning message to be conveyed to a human operator, for instance, via a display module on the control panel 32 or on the auxiliary I/O device 51 such that appropriate preemptive action can be taken.

Figure 7:
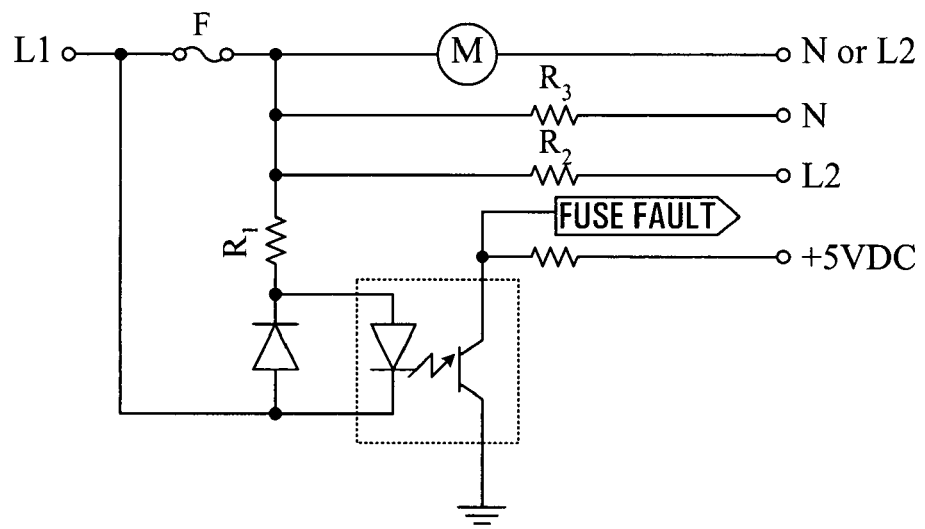
FIG. 7 is a block diagram of a fuse sensing circuit suitable for use in connection with the controller of FIG. 2 in accordance with a specific non-limiting embodiment of the present invention.

In accordance with yet another variant, processing module 40 may be configured to monitor the fuses of the spa system 10 to detect a burned fuse. In the non-limiting example of implementation depicted in FIG. 9, the sensing unit 44 includes fuses monitor 910. The fuses monitor 910 is comprised of a burned fuse sensing circuit adapted for detecting a burned fuse in the plurality of fuses 912. The burned fuse sensing circuit may be implemented using any suitable technique for detecting a burned fuse. A non-limiting example of implementation of a suitable fuse sensing circuit is depicted in FIG. 7. The burned fuse sensing circuit is responsive to the presence of a burned fuse for releasing a burned fuse indicator signal for transmission to the control unit 58. The control unit 58 is responsive to the receipt of the burned fuse indicator signal, identifying the plurality of fuses as potentially causing an abnormal operational condition of the bathing system. Upon receiving a burned fuse indicator signal, the control unit 58 may convey a warning message to a human operator identifying the plurality of fuses as potentially causing an abnormal operational condition of the bathing system, for instance, via a display module on the control panel 32 or on the auxiliary I/O device 51 (FIG. 2) such that appropriate action can be taken.

In accordance with another variant, processing module 40 may be configured for causing a ground-fault circuit interrupter (GFCI) 86 (shown in FIG. 1) to trip in the presence of an abnormal operational condition of the bathing system. In a non-limiting implementation, the processing module generates a signal for causing a ground-fault circuit interrupter (GFCI) 86 to trip. The ground-fault circuit interrupter (GFCI) 86 includes a breaker, which is adapted to trip if a ground fault or current overload condition occurs. The GFCI may be part of the circuit element 50 of the controller 30 or may be an outside component connected between the power source 29 and the controller 30 as shown in FIG. 1. In a specific implementation, the processing module 40 includes circuitry for causing a current leakage to ground in order to cause the GFCI to trip. FIG. 10 depicts a non-limiting example of implementation of a circuit suitable for causing the GFCI to trip. The circuit shown in FIG. 10 causes the GFCI to trip by inducing a current of about 5 mA or more in one of the lines. As depicted, a resistance is connected between the ground and one of the line voltages (L1 in FIG. 10), the resistance being selected to generate a current sufficiently large in order to make the GFCI trip.

The processing module 40 is adapted to store in memory data indicating that the ground-fault circuit interrupter (GFCI) trip was due to an overload condition.

In a first implementation where the GFCI is external to the controller 30, after the restoration of the supply with the ground-fault interrupter, the processing unit is adapted to display an error message to convey the overload condition to a human operator such that appropriate preemptive action can be taken. The message indicates to the user that the cause of the breaker trip was an overload.

In a second non-limiting implementation, where the GFCI is part of the controller 30, the processing module 40 stays powered even if the GFCI goes in the overload condition. In this case, the processing unit 40 is adapted to convey the overload condition message in real time to the user.

In a non-limiting implementation, if the GFCI was tripped and no overload condition was detected, the GFCI trip is assumed to be caused by a current leakage to the ground (ground fault). In this implementation, the processing module 40 is adapted for storing in memory the set of components and their corresponding actuated/non-actuated state. By knowing which spa components 47 were in the actuated state and which were just actuated before the breaker tripped, it is possible to determine which spa component potentially caused the failure. The processing module 40 is also adapted to send a message to convey to a human operator which spa components 47 were in the actuated state and which were just actuated before the breaker tripped such that appropriate preemptive action can be taken.

The above description of the embodiments should not be interpreted in a limiting manner since other variations, modifications and refinements are possible within the spirit and scope of the present invention. The scope of the invention is defined in the appended claims and their equivalents.

The invention claimed is:

1. A controller suitable for identifying an abnormal operational condition in a bathing system, the bathing system including a set of bathing unit components, each bathing unit component being adapted for acquiring an actuated state and a non-actuated state, the controller being suitable for establishing a connection with a power source through a ground fault circuit interrupter (GFCI), said controller comprising:
   a. a memory unit adapted for storing measurements indicative of electrical currents drawn by the bathing system under normal operating conditions, at least some measurements being indicative of electrical currents being drawn by respective bathing unit components when in the actuated state;
   b. a processing unit in communication with said memory unit adapted for:
      i. deriving at least one expected current measurement at least in part based on:
         1. desired state information associated to the bathing unit components in said set of bathing unit components; and
         2. the measurements stored on the memory unit;
      ii. obtaining an actual measurement of a current drawn by the bathing system;
      iii. detecting an abnormal operational condition associated with the bathing system at least in part based on the at least one expected current measurement and on the actual current measurement;
      iv. in response to detection of an abnormal operational condition associated with the bathing system in part based on the at least one expected current measurement and on the actual current measurement, inducing a current leakage to ground such as to cause the ground fault circuit interrupter (GFCI) to trip.

2. A controller as defined in claim 1, wherein said controller includes a plurality of actuators associated to respective bathing unit components, said processing unit being operative for controlling said plurality of actuators such as to cause the bathing unit components in said set of bathing unit components to acquire either one of the actuated state or the non-actuated state.

3. A controller as defined in claim 2, wherein the plurality of actuators includes a relay.

4. A controller as defined in claim 2, wherein said processing unit is operative for identifying an actuator in said plurality of actuators as potentially causing at least part of the abnormal operational condition of the bathing unit.

5. A controller as defined in claim 1, wherein said controller further comprises a circuit responsive to the detection of an abnormal operational condition associated with the bathing system for inducing the current leakage to ground such as to cause the ground fault circuit interrupter (GFCI) to trip.

6. A controller as defined in claim 1, wherein the set of bathing unit components includes at least one bathing unit component selected from the set consisting of a heating module, a pump, an ozonator, a CD player and an air blower.

7. A controller as defined in claim 1, wherein said processing unit is operative for identifying at least one bathing unit component potentially causing at least part of the abnormal operational condition of the bathing unit.

8. A controller as defined in claim 1, wherein said controller includes an output module in communication with said processing unit, said output module being adapted for conveying the abnormal operational condition associated to the bathing system.

9. A controller as defined in claim 8, wherein said output module includes a transmitter operative to transmit a signal conveying an abnormal operational condition associated to the bathing system.

10. A controller suitable for use in a bathing system, the bathing system including a set of bathing unit components, each bathing unit component being adapted for acquiring an actuated state and a non-actuated state, the bathing unit components drawing an electrical current when in the actuated state, the controller being suitable for establishing a connection with a power source though a ground fault circuit interrupter (GFCI), said controller comprising:
   a. a plurality of actuators associated to respective bathing unit components, during normal operational conditions the actuators being operative for causing bathing unit components to acquire either one of the actuated state or the non-actuated state;
   b. a processing unit in communication with the plurality of actuators, said processing unit being operative for:
      i. controlling said plurality of actuators such as to cause the bathing unit components in said set of bathing unit components to acquire either one of the actuated state or the non-actuated state;
      ii. detecting an abnormal operational condition associated with an actuator in the plurality of actuators, the abnormal operational condition being detected at least in part based on an expected measurement and an actual measurement, the expected measurement being conditioned in part by desired state information associated with the bathing unit components in said set of bathing unit components;
      iii. in response to detection of an abnormal operational condition associated with an actuator in the plurality of actuators, inducing a current leakage to ground such as to cause the ground fault circuit interrupter (GFCI) to trip.

11. A controller as defined in claim 10, wherein said controller further comprises a circuit responsive to the detection of an abnormal operational condition associated with the actuator in the plurality of actuators for inducing the current leakage to ground such as to cause the ground fault circuit interrupter (GFCI) to trip.

12. A controller as defined in claim 10, wherein at least some actuators in said plurality of actuators are adapted for acquiring either one of a closed status and an open status for causing bathing unit components to acquire either one of the actuated state or the non-actuated state.

13. A controller as defined in claim 12, wherein the processing unit is adapted for causing the given actuator to acquire the closed status when a voltage across the given actuator is near zero.

14. A controller as defined in claim 10, wherein said controller further comprises a memory unit adapted for storing measurements indicative of electrical currents drawn by the bathing system under normal operating conditions, at least some measurements being indicative of the electrical currents being drawn by respective bathing unit components when in the actuated state, said processing unit being operative for detecting an abnormal operational condition associated with an actuator in the plurality of actuators at least in part on the basis of measurements stored on the memory unit.

15. A controller as defined in claim 10, wherein said controller further comprises a memory unit adapted for storing measurements indicative of reaction times associated to the actuators in the plurality of actuators, said processing unit being operative for detecting an abnormal operational condition associated with an actuator in the plurality of actuators at least in part on the basis of measurements indicative of reaction times stored on the memory unit.

16. A controller as defined in claim 15, wherein the measurements indicative of reaction times associated to the actuators in the plurality of actuators include opening reaction times and closing reaction times.

17. A controller as defined in claim 10, wherein said controller further comprises a memory unit adapted for storing measurements indicative of voltages across respective actuators in the plurality of actuators, said processing unit being operative for detecting an abnormal operational condition associated with a given actuator in the plurality of actuators at least in part on the basis of at least one measurement stored on the memory unit indicative of a voltage across the given actuator in the plurality of actuators.

18. A controller as defined in claim 10, said processing unit being operative for:
  a. obtaining a measurement indicative of an actual reaction time associated with a given actuator in the plurality of actuators;
  b. detecting an abnormal operational condition associated with a given actuator at least in part on the basis of the actual reaction time obtained and a certain threshold reaction time.

19. A controller as defined in claim 18, wherein the threshold reaction time is derived at least in part on the basis of measurements obtained and stored on a memory unit.

20. A controller as defined in claim 10, said processing unit being operative for:
  a. obtaining a measurement indicative of an actual reaction time associated with a given actuator in the plurality of actuators;
  b. detecting an abnormal operational condition associated with a given actuator at least in part on the basis of the actual reaction time obtained and a certain range of accepted reaction times.

21. A controller as defined in claim 10, wherein said controller includes an output module in communication with said processing unit, said output module being adapted for conveying the abnormal operational condition associated to the bathing system.

22. A controller as defined in claim 21, wherein said output module includes a transmitter operative to transmit a signal conveying an abnormal operational condition associated to the bathing system.

23. A controller as defined in claim 22, wherein said transmitter is operative to transmit the signal over a wireless link.

24. A controller as defined in claim 23, wherein the wireless link is a radio frequency (RF) link.

25. A controller as defined in claim 23, wherein the wireless link is an infra-red (IR) link.

26. A method for monitoring a controller of a bathing system, the controller including a plurality of actuators associated to respective bathing unit components, during normal operational conditions, the actuators being operative for causing bathing unit components to acquire either one of an actuated state and a non-actuated state, said method comprising:
  a. establishing a connection with a power source through a ground fault circuit interrupter (GFCI);
  b. controlling the plurality of actuators such as to cause the bathing unit components in said set of bathing unit components to acquire either one of the actuated state or the non-actuated state;
  c. detecting an abnormal operational condition associated with an actuator in the plurality of actuators, the abnormal operational condition being detected at least in part based on an expected measurement and an actual measurement, the expected measurement being conditioned in part by desired state information associated with the bathing unit components in said set of bathing unit components;
  d. in response to detection of an abnormal operational condition associated with an actuator in the plurality of actuators, inducing a current leakage to ground such as to cause the ground fault circuit interrupter (GFCI) to trip.

27. A method as defined in claim 26, wherein said method comprises:
  a. storing measurements indicative of electrical currents drawn by the bathing system under normal operating conditions, each measurement being indicative of the electrical current being drawn by a respective bathing unit component when in the actuated state;
  b. detecting an abnormal operational condition associated with an actuator in the plurality of actuators at least in part on the basis of the measurements indicative of electrical currents stored.

28. A method as defined in claim 26, wherein said method comprises:
  a. storing measurements indicative of reaction times associated to the actuators in the plurality of actuators;
  b. detecting an abnormal operational condition associated with an actuator in the plurality of actuators at least in part on the basis of measurements indicative of the reaction times stored.

29. A method as defined in claim 28, wherein the measurements indicative reaction times associated to the actuators in the plurality of actuators include opening reaction times and closing reaction times.

30. A method as defined in claim 26, wherein said method comprises:
  a. storing measurements indicative of voltages across respective actuators in the plurality of actuators;
  b. detecting an abnormal operational condition associated with a given actuator in the plurality of actuators at least in part on the basis of at least one measurement stored on the memory unit indicative of a voltage across the given actuator in the plurality of actuators.

31. A method as defined in claim 26, said method further comprising:
  a. obtaining a measurement indicative of an actual reaction time associated with a given actuator in the plurality of actuators;
  b. detecting an abnormal operational condition associated with a given actuator at least in part on the basis the actual reaction time obtained and a certain threshold reaction time.

32. A method as defined in claim 26, said method further comprising:
  a. obtaining a measurement indicative of an actual reaction time associated with a given actuator in the plurality of actuators;
  b. detecting an abnormal operational condition associated with a given actuator at least in part on the basis the actual reaction time obtained and a certain range of accepted reaction times.

33. A controller suitable for identifying an abnormal operational condition in a bathing system, the bathing system including a set of bathing unit components, each bathing unit component being adapted for acquiring an actuated state and a non-actuated state, the controller being suitable for establishing a connection with a power source through a ground fault circuit interrupter (GFCI), said controller comprising:
  a. a plurality of actuators associated to respective bathing unit components, during normal operational conditions the actuators being operative for causing bathing unit components to acquire either one of the actuated state or the non-actuated state;
  b. a processing unit in communication with the plurality of actuators, said processing unit being operative for:
    i. detecting an abnormal operational condition associated with at least one component in the set of bathing unit components;
    ii. in response to detection of an abnormal operational condition associated with at least one component, controlling said plurality of actuators such as to cause the at least one bathing unit component to acquire the non-actuated state;
    iii. detecting an abnormal operational condition associated with an actuator in the plurality of actuators, the abnormal operational condition being detected at least in part based on an expected measurement and an actual measurement, the expected measurement being conditioned in part by desired state information associated with the bathing unit components in said set of bathing unit components;
    iv. in response to detection of an abnormal operational condition associated with an actuator in the plurality of actuators, inducing a current leakage to ground such as to cause the ground fault circuit interrupter (GFCI) to trip.

34. A controller as defined in claim 33, wherein said controller further comprises a circuit responsive to the detection of an abnormal operational condition associated with the bathing system for inducing the current leakage to ground such as to cause the ground fault circuit interrupter (GFCI) to trip.

35. A controller as defined in claim 33, wherein the set of bathing unit components includes at least one bathing unit component selected from the set consisting of a pump and an air blower.

36. A controller suitable for use in a bathing system, the bathing system including a set of bathing unit components, each bathing unit component being adapted for acquiring an actuated state and a non-actuated state, the bathing unit components drawing an electrical current when in the actuated state, the controller being suitable for establishing a connection with a power source through a ground fault circuit interrupter (GFCI), said controller comprising:
  a. a plurality of actuators associated to respective bathing unit components, during normal operational conditions the actuators being operative for causing bathing unit components to acquire either one of the actuated state or the non-actuated state;
  b. a processing unit in communication with the plurality of actuators, said processing unit being operative for:
    i. controlling said plurality of actuators such as to cause the bathing unit components in said set of bathing unit components to acquire either one of the actuated state or the non-actuated state;
    ii. detecting an abnormal operational condition associated with an actuator in the plurality of actuators;
    iii. in response to detection of an abnormal operational condition associated with an actuator in the plurality of actuators, inducing a current leakage to ground such a to cause the ground fault circuit interrupter (GFCI) to trip.

* * * * *